(12) United States Patent
Nichols

(10) Patent No.: US 7,769,932 B2
(45) Date of Patent: Aug. 3, 2010

(54) BITWISE ARBITRATION ON A SERIAL BUS USING ARBITRARILY SELECTED NODES FOR BIT SYNCHRONIZATION

(75) Inventor: Steven C. Nichols, Maple Grove, MN (US)

(73) Assignee: Honeywell International, Inc., Morristown, NJ (US)

( * ) Notice: Subject to any disclaimer, the term of this patent is extended or adjusted under 35 U.S.C. 154(b) by 1124 days.

(21) Appl. No.: 11/223,278

(22) Filed: Sep. 9, 2005

(65) Prior Publication Data

US 2007/0067518 A1 Mar. 22, 2007

(51) Int. Cl.
G06F 13/00 (2006.01)
(52) U.S. Cl. .................. 710/107; 710/110; 710/240; 370/324; 326/26
(58) Field of Classification Search .......... 710/107, 710/110, 240; 326/26; 370/324
See application file for complete search history.

(56) References Cited

U.S. PATENT DOCUMENTS

| | | | |
|---|---|---|---|
| 4,654,889 A | 3/1987 | Shutterly | |
| 4,745,596 A | 5/1988 | Sata | |
| 4,785,453 A | 11/1988 | Chandran et al. | |
| 5,001,642 A | 3/1991 | Botzenhardt et al. | |
| 5,105,441 A * | 4/1992 | Borst et al. | 375/288 |
| 5,111,460 A | 5/1992 | Botzenhardt et al. | |
| 5,175,821 A | 12/1992 | Dutcher et al. | |
| 5,293,571 A | 3/1994 | Matsuda et al. | |
| 5,303,348 A | 4/1994 | Botzenhardt et al. | |
| 5,398,243 A | 3/1995 | Aguilhon et al. | |
| 5,499,247 A | 3/1996 | Matsuda et al. | |
| 5,523,704 A * | 6/1996 | So | 326/30 |
| 5,617,545 A | 4/1997 | Ogata et al. | |
| 5,717,795 A | 2/1998 | Sharma et al. | |
| 5,740,353 A | 4/1998 | Kreulen et al. | |
| 5,805,614 A | 9/1998 | Norris | |
| 5,812,556 A | 9/1998 | Schmidt | |
| 5,854,454 A | 12/1998 | Upender et al. | |

(Continued)

FOREIGN PATENT DOCUMENTS

EP 1020784 7/2000

(Continued)

OTHER PUBLICATIONS

Siemens. CANPRES Version 2.0. Oct. 1998.*

(Continued)

*Primary Examiner*—Mark Rinehart
*Assistant Examiner*—Matthew D Spittle
(74) *Attorney, Agent, or Firm*—Hollingsworth & Funk, LLC

(57) ABSTRACT

A plurality of nodes are coupled via a serial data bus A transition from a first state to a second state is repeatedly transmitted onto the bus from a node arbitrarily selected from the plurality of nodes and is defined as the bit master. One or more of the nodes transmits onto the bus dominant and recessive states at a first predetermined time after each transition. The transmitted states represent respective dominant and recessive bits of an attempted message. The plurality of nodes detect dominant and recessive states of the bus at a second predetermined time after each transition. Any of the one or more nodes that transmits a recessive bit at the first predetermined time and detects a dominant bit at the second predetermined time ceases transmission of bits onto the bus.

22 Claims, 9 Drawing Sheets

U.S. PATENT DOCUMENTS

| | | | |
|---|---|---|---|
| 5,856,976 | A | 1/1999 | Hirano |
| 5,903,565 | A | 5/1999 | Neuhaus et al. |
| 6,111,673 | A | 8/2000 | Chang et al. |
| 6,167,057 | A | 12/2000 | Kishigami et al. |
| 6,267,219 | B1 * | 7/2001 | Spannhake et al. .......... 198/323 |
| 6,353,775 | B1 | 3/2002 | Nichols |
| 6,363,066 | B1 * | 3/2002 | Frimodig .................... 370/360 |
| 6,373,376 | B1 | 4/2002 | Adams et al. |
| 6,434,112 | B1 | 8/2002 | Kwon |
| 6,640,156 | B1 * | 10/2003 | Brooks et al. ............... 700/213 |
| 6,664,821 | B2 * | 12/2003 | De Haas et al. ............. 327/108 |
| 6,687,579 | B2 * | 2/2004 | Thompson et al. ............ 701/21 |
| 7,183,793 | B2 * | 2/2007 | Jordanger et al. ............. 326/26 |
| 7,269,675 | B2 * | 9/2007 | Dalakuras et al. ........... 710/107 |
| 2002/0146031 | A1 | 10/2002 | Nichols |
| 2002/0172211 | A1 | 11/2002 | Nichols |
| 2008/0063006 | A1 | 3/2008 | Nichols |

OTHER PUBLICATIONS

Corrigan, Steve. Introduction to the Controller Area Network (CAN). Texas Instruments Application Report. Aug. 2002.*

Xilinx. Manchester Encoder-Decoder for Xilinx CPLDs. XAPP339. v1.3. Oct. 1, 2002.*

Guastella, Robert. Back to the Future: Manchester Encoding. EE Times-India. Feb. 2008.*

Koopman et al. Analysis of the Train Communication Network Protocol Error Detection Capabilities. Feb. 25, 2001.*

Mannisto et al. An Overview of Controller Area Network (CAN) Technology. Machine Bus Corporation. Nov. 12, 2003.*

Jean-Lien C. Wu, et al., Practical Aspects and Experiences. A New Bus Contention Scheme in s/net with Dynamic Priority; Parallel Computing, Elsevier Publishers, Amsterdam, NL, vol. 20, No. 7, pp. 1045-1046, Jul. 1, 1994.

P. Hank et al., SJA1000 Stand-Alone CAN Controller; Phillips, Appliciato note; Sections 2., 4.2, 5.2-5.4.

D. John Oliver, "Implementing the J1850 Protocol", Intel Corporation, p. 1-15. http://www.intel.com/design/intarch/papers/j1850_wp.pdf.

* cited by examiner

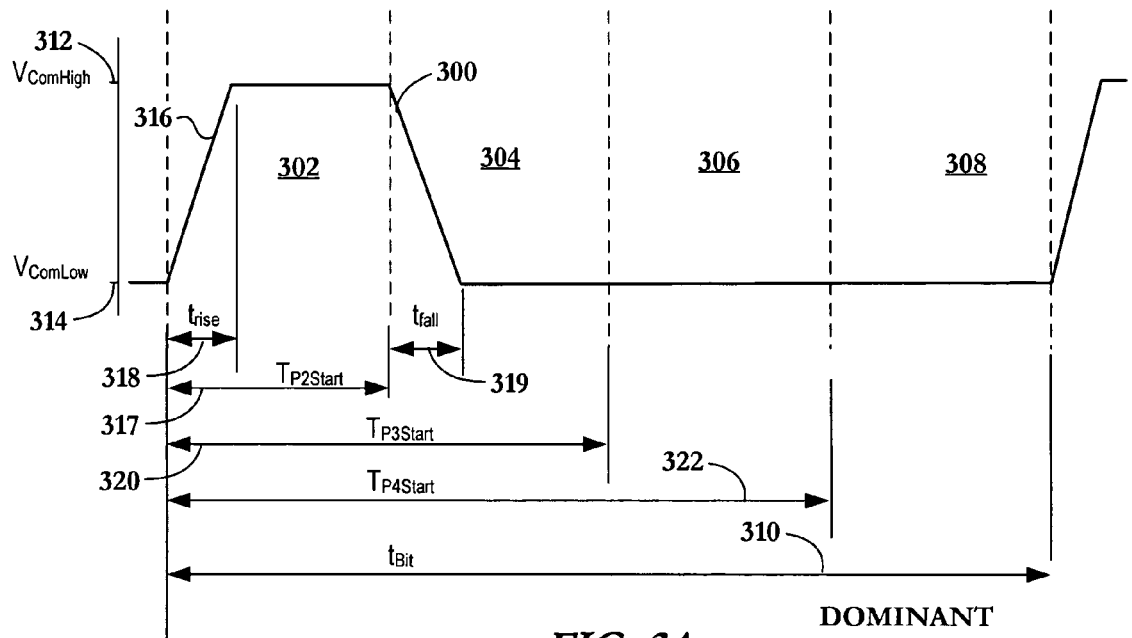
*FIG. 3A*  DOMINANT BIT ENCODING
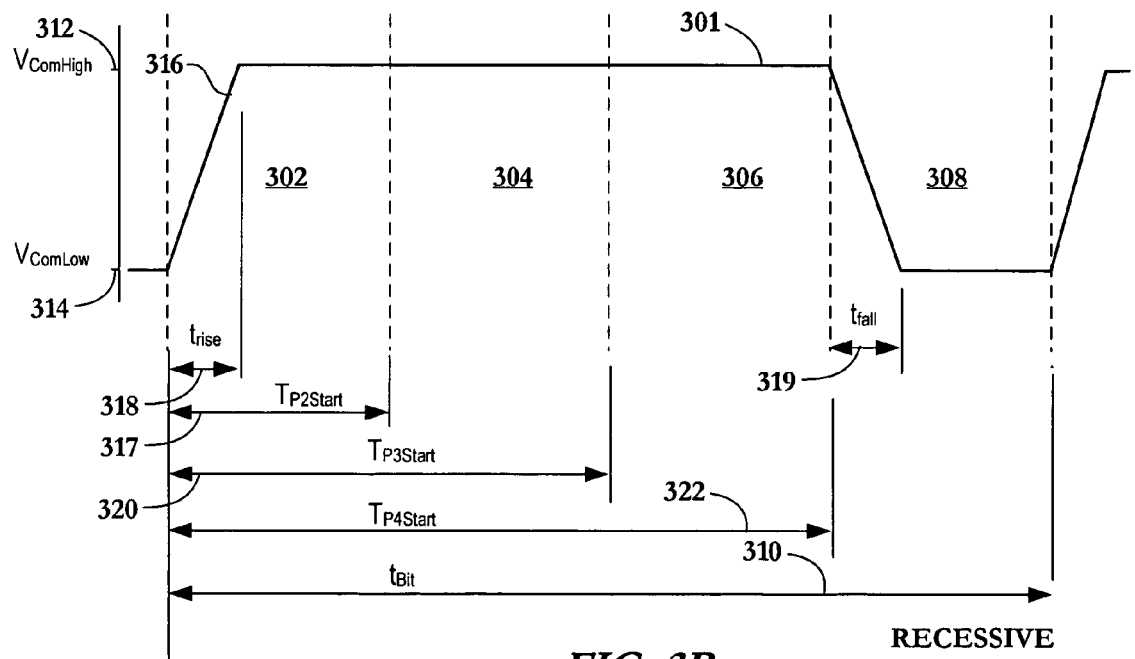
*FIG. 3B*  RECESSIVE BIT ENCODING

BITWISE ARBITRATION ON A SERIAL BUS USING ARBITRARILY SELECTED NODES FOR BIT SYNCHRONIZATION

FIELD OF THE INVENTION

This invention relates in general to data communications, and in particular to arrangements using message sending nodes coupled via a serial bus.

BACKGROUND

The availability of small, low cost, and relatively powerful microprocessors has resulted in these devices being used a variety of new ways. Previously, the higher cost of microprocessors meant they would be employed only for more complex tasks. However, the commodity market for cheap microprocessors has allows these devices to be used as substitutes for conventional or special purpose circuits, often at equal or lower cost. At the same time, the device's processing power allows them to handle additional functions in a particular application that would be much more difficult to implement using conventional circuits.

In the fields such as distributed control and process management, the availability of cheap microprocessors allows more complex interactions between distributed devices. For example, there are numerous different electrical functions that are initiated at various places throughout an automated system. These functions may include activating mechanical devices, sensing physical quantities, accepting user inputs/controls, detecting system failures and improper states, etc. Conventional approaches require one or more conductors to be provided for each of these functions. For example, a separate wire may connect each temperature gauge in a system with an associated temperature sensor. In environments such as automotive and aerospace, where space and weight are at a premium, such wiring requirements can severely restrict the functionality that can be provided by conventional approaches.

By making use of the previously mentioned microprocessors, the number of conductors needed to provide inter-device communication is greatly reduced. Instead of dedicated wires between related components, a single wire may provide a serial signal path that is used for all inter-device communications. A power supply and return wire may also be connected to some or all of the components. Each device includes a communications node that can send messages to and receive messages from the other devices' nodes on the signal path. Each node receives every message on the signal wires and uses the messages appropriate for operating its associated device.

One problem using a single serial signal path is that of message collisions, where two or more nodes send messages on the signal wires at the same time. One solution to resolving message collisions is provided by the Controller Area Network (CAN) system, which uses bit-wise arbitration. In the CAN system, messages are encoded using signals that represent either dominant or recessive bits. If a communicator sends a dominant bit signal, the dominant bit is present on the signal path regardless of the number of other communicators that are sending recessive bits. Each communicator senses the signal on the signal path, and ceases sending its message if, when sending a recessive bit, the node senses a dominant bit. This process of detecting collisions at each node and ceasing sending messages upon detecting of collisions is referred to as arbitration.

The leading bits of a message in a CAN-type system act inherently as a priority during arbitration. Messages that have the largest sequence of dominant leading bits will win arbitration over other simultaneously transmitted messages. Therefore, the system designer can ensure messages have the desired priority by forming messages having a particular ordering of leading bits in relation to other messages transmitted on the system.

In order to synchronize nodes on a CAN-type system, each receiving node must adjust its internal timers with each received bit so that the receiving nodes stay synchronized with the transmitting nodes. However, it was recognized that for low data-rate systems, such an elaborate synchronization mechanism could be avoided if a commonly accessible timing signal could be used to synchronize the nodes.

For example, in ENVIRACOM® systems provided by Honeywell®, each bit transmitted on the serial line is synchronized to a half cycle of AC power. Where the AC line frequency is 60 Hz or 50 Hz, this provides data rates of 120 bits per second or 100 bits per second, respectively. Because ENVIRACOM is primarily intended for use in residential Heating, Ventilation, and Air Conditioning (HVAC) systems, these low data rates are not an impediment to providing useful system controls. This simplified method of synchronizing control/sensing nodes allows creating relatively sophisticated HVAC systems using legacy thermostat wiring and relatively low-cost HVAC components.

However, as systems become more complicated, the need for higher data rate bus speeds in ENVRACOM-type systems is becoming apparent. However, such systems need to retain backwards-compatibility with previous devices whose data rates are synchronized to the power line frequency. Such systems should also retain compatibility with the higher layers of the message-exchange protocols so that previously designed application software can be reused with the higher data rate systems.

SUMMARY

The present disclosure relates to data communications between nodes coupled to a serial bus. In particular, a plurality of nodes are coupled via a serial data bus so that simultaneous transmission on the bus of a dominant state by at least one of the nodes and a recessive state by the other nodes results in the dominant state being detectable on the bus. A transition from a first state to a second state is repeatedly transmitted onto the bus from a node arbitrarily selected from the plurality of nodes. The first and second states are complementary states selected from the dominant and recessive states. The arbitrarily selected node is defined as the bit master. One or more of the nodes transmits onto the bus dominant and recessive states at a first predetermined time after each transition. The transmitted states representing respective dominant and recessive bits of an attempted message. The plurality of nodes detect dominant and recessive states of the bus at a second predetermined time after each transition. The sensed dominant and recessive states representing respective dominant and recessive bits of a detected message. Any of the one or more nodes that transmits a recessive bit at the first predetermined time and detects a dominant bit at the second predetermined time ceases transmission of bits onto the bus.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

FIG. 3A is a timing diagram illustrating the transmission of a dominant bit on a bus according to embodiments of the present invention;

FIG. 3B is a timing diagram illustrating the transmission of a recessive bit on a bus according to embodiments of the present invention;

DETAILED DESCRIPTION

Figure 1:
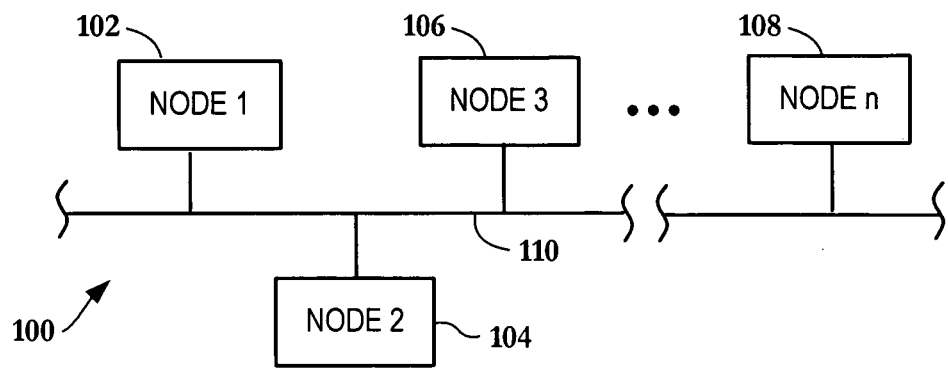
FIG. 1 is a diagram showing a system of nodes coupled via a serial bus according to embodiments of the present invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention involves communicating messages between data processing nodes via a common data path or bus. The data path is generally a serial data bus coupled to each of the nodes. Communications on the data path utilize non-destructive bitwise arbitration for dealing with contention. This arbitration utilizes dominant and recessive states (e.g., voltages) on the common data path.

In non-destructive arbitration, the state of the common data path at any given time will transition between two complementary states, the dominant and recessive state. When at least one node transmits a dominant state and other nodes transmit a recessive state, the dominant state will be seen on the data path by all nodes. In the embodiments presented herein, the dominant and recessive states are represented as "CommLow" and "CommHigh," respectively. CommHigh represents a relatively high voltage, and "CommLow", represents a relatively low voltage. It will be appreciated that the nodes only need make determinations of dominant and recessive states based on the relative higher value of CommHigh as compared to CommLow; the actual potential/voltage of CommLow and CommHigh may assume any values useful to the system designer as long as the potential difference between CommLow and CommHigh is maintained.

During simultaneous transmission of CommHigh and CommLow by different devices, the resulting value detected on the data line is CommLow. Thus, CommLow is said to be the dominant state on the bus. However, those skilled in the art will appreciate that the invention may be equally applicable to systems where higher voltages represent the dominant state and lower voltages represent the recessive state.

The data communication nodes determine the start of each bit of the transmitted messages by detecting a transition from a first state to a second state on the bus. The first and second state are complementary, and are selected from the recessive and dominant states (e.g., CommHigh and CommLow). For the arrangements illustrated herein, the bit-start transitions will be from the dominant state to the recessive state (e.g., from CommLow to CommHigh). Thus, the bus will be in the dominant state (CommLow), at least just before transmitting a bit. It will be appreciated that the invention may be practiced using an inverse arrangement, that is an arrangment where bit-start transitions are defined as moving from a recessive state (CommHigh) to a dominant state (CommLow).

The transitions that signal the start of each bit can be provided by any node on the system, that node being referred to as the Bit Master. Generally, the system can provide communications for two classes of devices: those devices that are capable of arbitrating for Bit Master (Bit Master Capable) and those that are not (Bit Master Incapable). The Bit Master may be arbitrarily selected from any Bit Master Capable nodes on the bus. The system will have at least one Bit Master Capable device, and that device will assume that there may be other Bit Master Capable devices on the bus. Therefore any Bit Master Capable device will include logic that allows arbitration for Bit Master.

At any time, Bit Master Capable nodes may arbitrate to act as Bit Master in order to provide a backup source of bit-start transitions or for other bus control purposes (e.g., to control the bit rate). As an example of the former, other Bit Master Capable nodes on the bus may be configured to measure the bit-start transitions provided by the Bit Master, and to take over as Bit Master if the characteristics of the transitions satisfy a predetermined criteria that indicate the current Bit Master is inoperative. Usually nodes will attempt to take over as Bit Master if the time interval between transitions exceeds a predetermined value.

The Bit Master typically transmits the bit-start transition at regular intervals, the time between intervals corresponding to the period of each bit. The bus state (e.g., voltage) is sampled at various times during each of the periods, and depending on the state of the bus during those samples, the period is interpreted as having produced either a 'recessive (0), or 'dominant (1)' bit. During simultaneous transmission of a dominant and recessive bit by different devices, the resulting value on the data line is a dominant bit.

Although the recessive and dominant bits are formed by measuring recessive or dominant bus states at particular times, a distinction should be drawn between dominant and recessive bits and dominant and recessive bus states. The dominant and recessive bus states refer to the electrical characteristics (e.g., voltage) of the data bus at particular time, and may be considered to operate at the physical layer of the system. Generally, the dominant and recessive behavior occurs due to the design of the transceiver circuitry of the nodes that are coupled to the data bus. The dominant and recessive bits operate at the data link layer, and are determined based on multiple samples of bus states during each bit period. Those samples may include combinations of dominant and recessive bus states for each bit type. The dominant and recessive bits are logical states used by the data link layer for bit-wise arbitration of message transmissions.

When nodes according to the present embodiments attempt to assert a recessive state on the bus, the nodes attempt to bring the bus to CommHigh voltage level. In order to overcome line capacitance, each device on the bus includes a weak pull-up circuit and a strong pull-up circuit for asserting CommHigh. The strong pull-up provides a major current that is capable of overcoming the line capacitance and pulls the bus line up quickly. The weak pull-up provides a minor current that holds the bus line high once it gets there but is not strong enough to hold it high if any other device is pulling it low. All devices continuously use their minor current to gently pull the bus line high.

All nodes on the system will attempt to transmit either CommLow or CommHigh on the data bus at any given time. Any nodes that are currently transmitting bits will begin transmitting either a dominant or recessive signal level at a first predetermined time following the bit start transition. Whether dominant or recessive signal levels are sent at this first predetermined time is based on whether the device is attempting to send dominant and recessive bits of a message, respectively. At a second predetermined time following the transition, all of the nodes will sample the bus to detect whether the bus is in a dominant or recessive state. This detection of a dominant or recessive bus state at the second predetermined time results in the detection of respective dominant and recessive bits. Any nodes that transmitted a recessive bit but detected a dominant bit will cease transmission of any further bits of their respective messages.

In reference now to FIG. 1, an arrangement 100 of nodes 102, 104, 106, 108 is illustrated according to embodiments of the present invention. The nodes 102, 104, 106, 108 are coupled to a bus 110. Although four nodes 102, 104, 106, 108 are illustrated, it will be appreciated that any number of nodes may be coupled in the arrangement depending on physical characteristics of the bus 110. For example, where the bus 110 includes one or more electrical conductors, the maximum number of nodes may depend on maximum allowable current through the bus, line capacitance, propagation delays, reflections, etc. The nodes 102, 104, 106, 108 generally include electrical and data processing characteristics that allow intercommunication between entities on the bus. The nodes 102, 104, 106, 108 may be configured to provide functionality of any device known in the art, including sensors, controllers, transducers, power supplies, computers, switches, gateways, repeaters, converters, bridges, etc.

The bus 110 may include any known topography, including ring, star, daisy chain, linear, stubs, or any combination thereof. The bus 110 may include any combination of signal, power and ground/return lines. Generally the busses 110 described herein will be electrical conductors, but it will be appreciated that some or all of the bus concepts described herein may be applicable to any common data carrier medium, such as fiber optic and wireless technologies.

Figure 2:
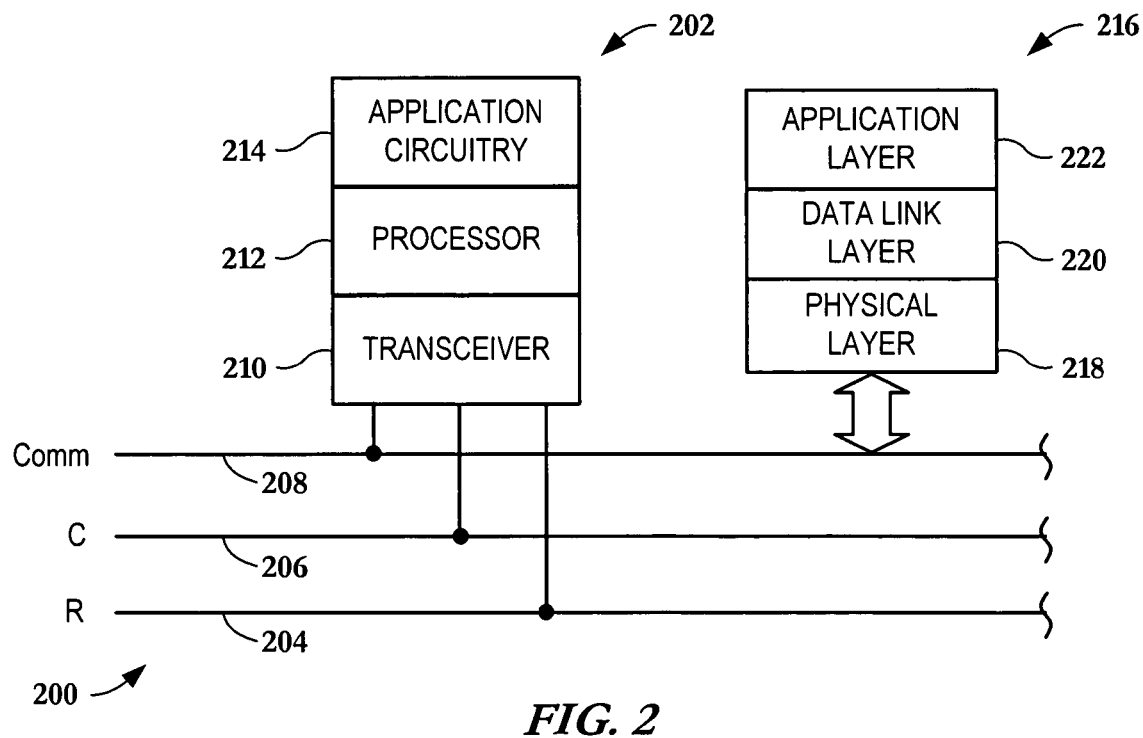
FIG. 2 is a diagram of a single node coupled to a data bus according to embodiments of the present invention.

A more particular arrangement of a bus 200 and node 202 according to embodiments of the present invention is shown in FIG. 2. The illustrated bus 200 and node 202 particularly suited to residential HVAC communications systems, such as ENVIRACOM networks. The bus 200 includes R and C lines 204, 206, which provide 24VAC at the power line frequency (e.g., 60 Hz). The power for the R and C lines 204, 206 may be provided by a standard residential HVAC transformer. The node 202 may receive its power from the R and C lines 204, 206, or the node 202 may use its own source of power. The bus also includes a Com line 208 (also referred to herein as the "data line" or "data bus"), which is the serial data communications line. All information is transmitted and received by nodes 202 through the Com connection 208.

All nodes 202 communicating on the bus 202 may have a connection to the R, C, and Com lines 204, 206, 208. These three lines 204, 206, 208 may be connected in parallel to all nodes 202 in a typical HVAC system. All voltages in the nodes 202 and elsewhere in the system are described with reference to the C line 206 unless otherwise stated. It is assumed that all timing and voltages on the R and C lines 204, 206 lines are sinusoidal, although in practice, saturation of the transformer core will usually result in a distorted sinusoid. The timing and voltages may be specified so that correct transmission and reception will occur even when core saturation occurs.

The nodes 202 typically have at least three circuitry components: a transceiver 210, a processor 212, and application circuitry 214. It will be appreciated that these circuitry components 210, 212, 214 are defined for purposes of explanation; the nodes 202 may include additional or different functional delineations than illustrated in FIG. 2. The transceiver 210 provides bus interface circuitry that, among other things, provides an indicator to the processor 212 of whether the data line 208 is currently reading a dominant or recessive state. The transceiver 210 may also provide the ability to set the data line 208 to a dominant or recessive state. The interface between the transceiver 210 and processor 212 will include at least two signal paths: one path used by the processor 212 to transmit onto the bus, and the other path indicating what the actual value detected on the bus. In order for the transceiver 210 and processor 212 to detect collisions during transmission, these two paths may have separate states/potentials at any given time.

The processor 212 may also provide higher level functions needed to communicate on the bus 210. These functions may include the ability to read, assemble and queue messages, handle bitwise arbitration, handle Bit Master arbitration, and deal with timing issues required for bus communications. The processor 212 generally interfaces with some form of memory, such as firmware, read-only memory (ROM), and random access memory (RAM). The memory stores instructions that allow the processor 212 to carry out its functions. The processor 212 also typically includes input-output interfaces for communicating with other node circuitry, such as the transceiver 210 and the application circuitry 214.

The application circuitry 214 may include electrical and mechanical components that allow each node 202 carry out its particular function. For example, if the node 202 is a temperature sensor, the application circuitry may include a thermocouple or thermistor, signal conditioning circuitry, and interface circuitry for communicating with the processor 212. The application circuitry 214 may include a specialized set of messages that deal with the node's functioning. The application circuitry 214 may have logic and/or memory for storing and using those messages, or that functionality may be provided as part of the processor 212. For example, the processor 212 may include a slot for a programmable ROM (PROM) that includes custom functionality associated with the application circuitry 214.

A system designer can readily assemble functional arrangements by choosing node devices 202 that include the appropriate application circuitry 214. The nodes 202 are capable of communicating via a generic set of protocols over the common bus 200. The ability for nodes 202 to easily intercommunicate over the bus 200 provides systems designers with flexibility in choosing components. A logical view of the communications protocol stack 216 is also shown in FIG. 2.

Three layers define the illustrated protocol stack 216: the physical layer 218, the data link layer 220, and the application layer 222. The scope of the physical layer 218 is the transfer of bits between the different nodes 202 with respect to all electrical properties, as well as the bit timing and synchronization specifications. The data link layer 220 defines the transfer packet protocol. The application layer 222 defines how the messages received through the physical layer 218 and data link layer 220 are used in the final application.

Embodiments of the data link layer 220 are described in commonly-owned U.S. patent application Ser. No. 09/777, 632 (hereinafter the '632 application) filed on Feb. 6, 2001 and entitled "High Level Message Priority Assignment By A Plurality Of Message-Sending Nodes Sharing A Signal Bus." The physical layer described in the '632 application utilized a sync generator that was synchronized to AC power. In particular, a zero crossing of the AC power signal signaled the beginning of each bit. The bit encoding described in the '632 application was Non-Return to Zero (NRZ), wherein bit values are determined based on the bus value over the entire bit period. The physical layer 218 according to embodiments of the present invention utilizes a different approach.

The physical layer 218 of the present invention generally utilizes a sync signal sent onto the data line 208 for each message bit. The synch signal is provided by an arbitrary node 202, also referred to as the Bit Master. Any node 202 coupled to the bus may act as the Bit Master. Further, any node 202 may assume the role of Bit Master, such as if the current Bit Master fails to respond in sufficient time. The use of an arbitrated Bit Master allows the system to realize data rates up to approximately 1K bits per second, as opposed to 120 bits per second for a system synched to 60 Hz AC power. By implementing a physical layer 218 as described herein, up to 32 nodes may be connected in a system over a path of up to 1000 feet using 18-22 gauge untwisted standard thermostat wire, without using any bus terminators.

An example of bit encoding on the serial data bus according to embodiments of the present invention is shown in FIG. 3A. FIG. 3A shows an example waveform 300 for encoding a single bit, in particular a dominant bit. In this implementation, a dominant bit represents a logical one, and a recessive bit represents a logical zero. The waveform 300 allows encoding data at a maximum baud rate of approximately 1K bits per second.

The waveform 300 is subdivided into four periods 302, 304, 306, and 308. If the period of the waveform 300 is at or near the minimum time value (and thus the maximum bit-rate) that the system is designed to support, the four periods 302, 304, 306, and 308 are of substantially similar duration. At lower bit-rates, the fourth period 308 may be much larger than the others. The minimum time required to transmit a single bit is shown as $t_{bit}$ 310. Although ideally the waveform 300 will have a period near $t_{bit}$, the system may still operate at bit periods that are much larger than $t_{bit}$. For example, the bit-rate may be slowed down to ensure backwards compatibility with slower devices.

There are two complementary values or states that the data line can take on, "CommHigh" 312, representing a relatively high voltage, and "CommLow" 314, representing a relatively low voltage. During simultaneous transmission of CommHigh 312 and CommLow 314 on the data line by different devices, the resulting value on the data line is CommLow 314. Therefore, CommLow 314 is the dominant state, and CommHigh 312 is recessive state.

The waveform 300 in FIG. 3A encodes a dominant (one) bit. A recessive bit waveform 301 is shown in FIG. 3B. During simultaneous transmission of a dominant and recessive bit by different devices, the resulting value registered at the data link layer by all devices is a dominant bit. The state of the data line detected during period 306 determines whether a dominant or recessive bit is detected. There is no gap required between bits.

Of all the nodes connected to the data line, an arbitrary node is automatically chosen as the Bit Master. The Bit Master generates the transition 316 that designates the start of a bit to all non-Bit Masters, thereby synchronizing the bit timing for all other devices. In the illustrated waveforms 300, 301, the transition 316 appears as a positive edge. The transition 316 is created by the Bit Master using its major pull-up current to assert CommHigh 312 on the Com line. Thus, during the transition 316, the Com line goes from a dominant signal state (e.g., CommLow 314) to a recessive signal state (e.g., CommHigh 312). The term "positive edge" may also be used herein to refer to the transition 316.

The transition 316 preferably occurs within a predefined minimum rise time 318. In this example, the minimum rise time is 25 microseconds, and is established to prevent the transmission of radio frequency interference on the Com line. The rise time 318 must not exceed a maximum value either, as the devices must detect the assertion of CommHigh in a predefined window (e.g., for the time $T_{P2Start}$ 317) within the first period 302. For similar reasons, a fall time 319 is used to define an acceptable range of values for negative edges occurring within the waveforms 300, 301.

In order to account for line noise, nodes will need to filter both positive and negative edges when attempting to detect waveforms such as 300, 301. In one example, positive and negative edges can be filtered by continuously sampling the line at close intervals to ensure detected transitions are not anomalous. In the present examples, filtering involves continuously sampling the line with no more than 3 uSec between samples until either 15 uSec of the same consecutive value occurs or 30 uSec occurs. The last sampled value indicates be the filtered state of the line. If the filtered state does not change value, the edge can be ignored.

At the start of the second period 304, any device sending a dominant bit pulls the Comm line low, as is shown in FIG. 3A. Otherwise, devices transmitting a recessive bit let the line stay high in period 302 as shown in FIG. 3B. Each device receives the dominant/recessive state of the bit by detecting the state of the Com line at the start of the third period 306, as indicated by time $t_{P3Start}$ 320. A value of CommLow detected at $t_{P3Start}$ 320 indicates a dominant bit (logical 1) as shown in FIG. 3A, while a high value indicates a recessive bit (logical 0) as shown in FIG. 3B.

When the Bit Master sees a dominant state at the start of the third period 306 (i.e., $t_{P3Start}$ 320), the Bit Master pulls the line low even if it is trying to send a recessive bit. At the beginning of the fourth period 308 (i.e., at time $t_{P4Start}$ 322), all devices except for the Bit Master release the line without using their major pull-up current. If the Bit Master isn't already pulling the line low (because all devices are sending a recessive bit), it pulls the line low at $t_{P4Start}$ 322. If a dominant bit was sent, the Bit Master continues to hold the line low through the fourth period 308. At the end of the bit, only the Bit Master is pulling the line low and will not have interference from other devices when it uses its major pull-up current at the start of the next bit.

Tables 1 and 2 below illustrates example values for the physical layer according to embodiments that are suitable for HVAC applications.

TABLE 1

Voltage and Current Values

| Parameter | Description | Min | Max | Units |
|---|---|---|---|---|
| $V_{CommHigh}$ | Instantaneous voltage at the unconnected Comm terminal when sending the CommHigh state, transformer voltage >=20 VAC | 12.9 | 18.0 | Volts |
| $V_{CommHigh}$ | If rated for lower than 20 VAC transformer voltage, instantaneous voltage at the unconnected Comm terminal when sending the CommHigh state, transformer voltage <20 VAC | 11.54 | 18.0 | Volts |
| $V_{CommLow}$ | Instantaneous voltage at the Comm terminal with an external 66 mA flowing into the Comm terminal when sending the CommLow state | 0.00 | 3.00 | Volts |
| $V_{CommHighRx}$ | Instantaneous voltage at the Comm terminal that will be detected as the CommHigh state | 9.40 | 42 | Volts |
| $V_{CommLowRx}$ | Instantaneous voltage at the Comm terminal that will be detected as the CommLow state | −42 | 6.50 | Volts |
| $I_{CommLow}$ | Instantaneous current out of the Comm terminal when the Comm voltage = 0 V, with only the minor pull-up current enabled | 0.90 | 2.10 | mA |
| $I_{CommLow}$ | Instantaneous current out of the Comm terminal when the Comm voltage = $V_{CommHigh}$ min, with only the minor pull-up current enabled | 0.81 | 2.10 | mA |
| $I_{CommPullup}$ | Instantaneous current out of the Comm terminal when the Comm voltage = 0 with the major pull up current enabled (Bit Master only) | | 177 | mA |

TABLE 2

Timing Values

| Parameter | Description | Min | Max | Units |
|---|---|---|---|---|
| $t_{bitave}$ | Average time between creating positive edges by the Bit Master | 0.925 | 1.075 | mSec |
| $t_{bit}$ | Time between any two consecutive positive edges created by the Bit Master | 0.875 | 1.125 | mSec |
| $t_{Rise}$ | Time from the start of a positive edge until reaching $V_{CommHigh}$ min (Bit Master only) (line capacitance = 0 to .068 uF on each line) | 25 | 50 | uSec |
| $t_{Fall}$ | Time from the start of a negative edge until reaching $V_{CommLow}$ max (line capacitance = 0 to .068 uF on each line) | 15 | 40 | uSec |
| $t_{P2Start}$ | Time from the start of a positive edge to the start of a falling edge when sending a dominant bit (Bit Master only) | 136.9 | 209.1 | uSec |
| $t_{P2Start}$ | Time from receiving a filtered positive edge to the start of a falling edge when sending a dominant bit (non Bit Master only) | 99.9 | 166.1 | uSec |
| $t_{P3Start}$ | Time from the start of a positive edge to the time the state of the bit is determined (Bit Master only). | 414.4 | 561.6 | uSec |
| $t_{P3Start}$ | Time from receiving a filtered positive edge to the time the state of the bit is determined (non Bit Master only). | 377.4 | 518.6 | uSec |
| $t_{RecLow}$ | Time from the start of a positive edge to the start of pulling the Comm line low when a dominant bit is received (Bit Master only) | 414.4 | 561.6 | uSec |
| $t_{P4Start}$ | Time from the start of a positive edge to the start of the Comm line pulled low when sending a recessive bit and a recessive bit is received (Bit Master only) | 691.9 | 884.1 | uSec |
| $t_{P4Start}$ | Time from receiving a positive edge to releasing the Comm line when sending a dominant bit (non Bit Master only) | 614.2 | 793.8 | uSec |
| $t_{BitMasterTimeout}$ | Time without detecting a $V_{CommLow}$ state before becoming the Bit Master | 10.0 | 30.0 | mSec |

Figure 4:
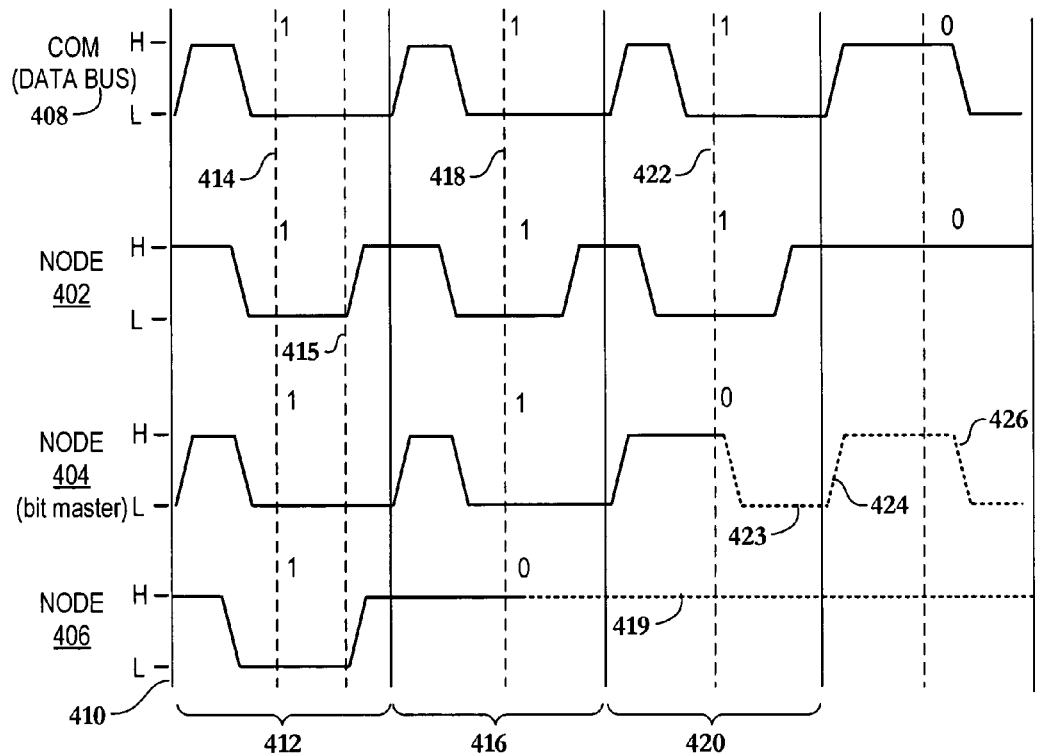
FIG. 4 is a timing diagram illustrating the bit-wise arbitration between a plurality of nodes on a bus according to embodiments of the present invention.

An example of bitwise arbitration according to embodiments of the present invention is shown in FIG. 4. In FIG. 4, three nodes 402, 404, and 406 are attempting to transmit a message onto the bus 408. The signals represented for the nodes 402, 404, 406 are those attempted to be transmitted by the respective nodes 402, 404, 406, while the signal for the data line/bus 408 is what all of the nodes 402, 404, 406 actually sense on the bus. Node 404 has arbitrarily been assigned as Bit Master, however any of the nodes 402, 404, 406 may assume the role of Bit Master under the proper circumstances.

At time 410, the Bit Master node 404 begins asserting a strong pull-up from CommLow to CommHigh. The other nodes 402, 408 detect this transition, and at a predefined time after the transition, the nodes 402, 408 will assert a CommLow if sending a dominant bit (one). All nodes in time period 412 are sending a dominant bit, therefore all nodes will send dominant signals at least until time 414 (which corresponds to $t_{P3Start}$ in TABLE 2 for this bit). At time 415 (which corresponds to $t_{P4Start}$ in TABLE 2) the non Bit Master nodes 402, 406 stop pulling the Com line low. The Bit Master node 404 continues to hold the line low until the beginning of the next bit, which is transmitted in time period 416.

During time period 416, nodes 402 and 404 are transmitting a dominant bit (one), while node 406 is transmitting a recessive bit (zero). At time 418, node 406 is transmitting a recessive CommHigh state (corresponding to a recessive bit), but detects a dominant CommLow state on the bus 408. Therefore, node 406 has lost arbitration, as indicated by the dashed portion 419 of the node's signal. Once having lost arbitration, node 406 will continue to listen to the bus, but will simply transmit the recessive CommHigh state using the minor pull-up current.

During the next time period 420, node 404 is transmitting a recessive bit (zero) and node 402 is transmitting a dominant bit (one). At time 422, node 404 is transmitting CommHigh, but detects CommLow on the bus 408, thus node 404 has lost arbitration at time 422, as indicated by dashed portion 423. Thereafter, node 402 is the only remaining transmitting node and will finish transmitting its message until completion (or until an error has been detected).

Even though node 404 has lost arbitration, node 404 is still Bit Master. Therefore, node 404 will still control the start time of each bit using a positive edge such as the transition 424. Also, the Bit Master node 404 will continue to pull the line low at the start of the third period even if Bit Master 404 is sending recessive bits and/or loses arbitration. This is indicated by the negative edge 426 being send by the Bit Master Bit Master 404.

Normally, the Bit Master node 404 will repeatedly send out the transition at an average minimum allowable time required to send one bit, such as time periods 412, 416, and 420. However, it will be appreciated that this period represents a lower limit on time between transitions, not an upper limit. The Bit Master node 404 may be enabled to increase the time between transitions, thus lowering the effective bit rate transmitted on the bus 408.

To maintain the maximum data transfer rate, the Bit Master node 404 will generally keep the time between transitions at or near the minimum possible value that for which the system is designed, e.g., $t_{bit}$ as defined in TABLE 2. However, there may be situations when the Bit Master node 404 may want to slow down the bit rate of the data bus 408. For example, the bit rate may be slowed down by a bridging device that connects the illustrated bus arrangement with legacy devices that communicate at a lower bit rate. Other advantages may provided by using a variable-rate Bit Master, such as being able to transmit at a lower frequency to reduce error rates, reduce electromagnetic emissions, reduce the effects of interfering transmissions that operate at the normal bit transmission frequency, etc.

Figure 5:
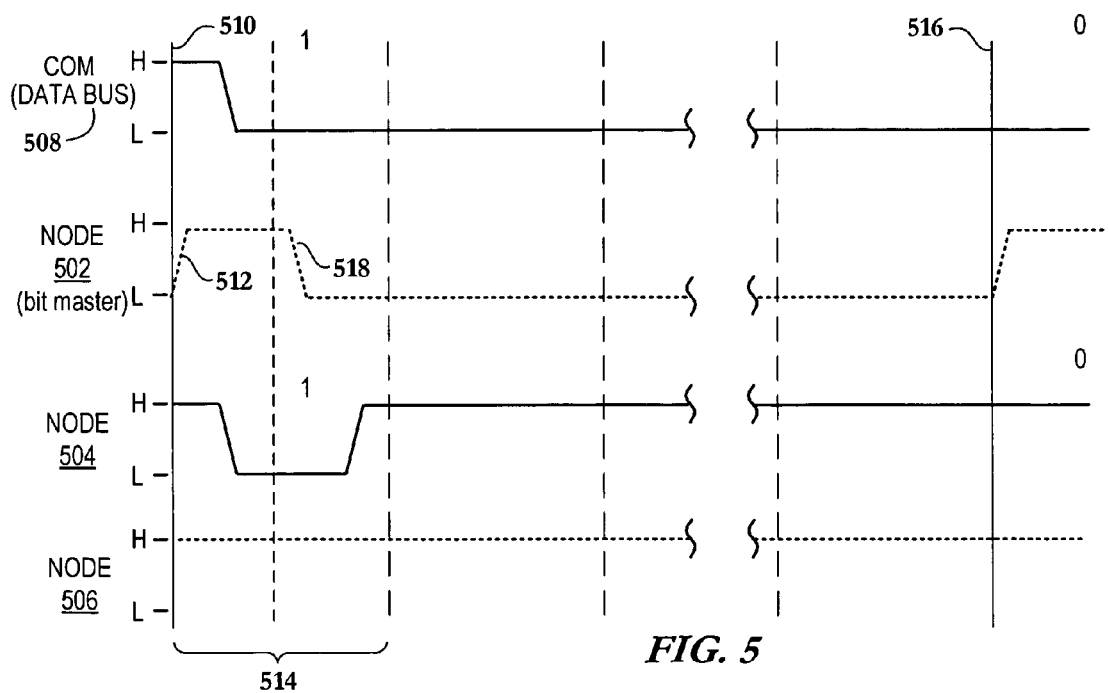
FIG. 5 is a timing diagram illustrating slowing of the bit rate on a bus by a Bit Master node according to embodiments of the present invention.

An example of a Bit Master using a lowered bit transmission frequency according to embodiments of the present invention is shown in FIG. 5. Three nodes 502, 504, and 506 are coupled to a bus 508. Node 502 is the Bit Master, and only node 504 is actively transmitting bits. At time 510, Bit Master node 502 asserts a transition 512 that indicates the start of a bit. Normally, the nodes 502, 504, and 506 would only need the indicated time period 514 in order to read the bit. However, after pulling the line low after bit detection (e.g., negative edge 518), the Bit Master node 502 delays asserting a transition onto the bus until time 516, after which time node 504 continues transmitting the next bit.

The effective bit rate as shown in FIG. 5 can be measured by determining the difference between transition times 510 and 516. The Bit Master node 502 can set this to a constant bit rate, or vary the bit rate as appropriate. Generally, nodes on the system will measure a timeout value from the last transition. Based on these measurements, node devices can detect when they are operating in the slower extended bit mode, or faster standard bit mode. This detection may also involve indicating the current mode to an upper communication layer when the duration between the most recent transition and the next most recent transition is a standard bit or an extended bit. The purpose of this requirement is to allow the data link layer to determine whether a bridge (or other device) is slowing the baud rate.

If the nodes measure a timeout between transitions that exceeds a predetermined value, then it may be assumed the current Bit Master is not responding, and another node will take over. In the example values of TABLE 2, this timeout value is denoted as $t_{BitMasterTimeout}$. In general, a Bit Master Capable node that is not currently acting as Bit Master will attempt to assert itself as Bit Master and generate a transition (e.g., positive edge) if a transition does not occur within $t_{BitMasterTimeout}$ of the last transition.

Figure 6A:
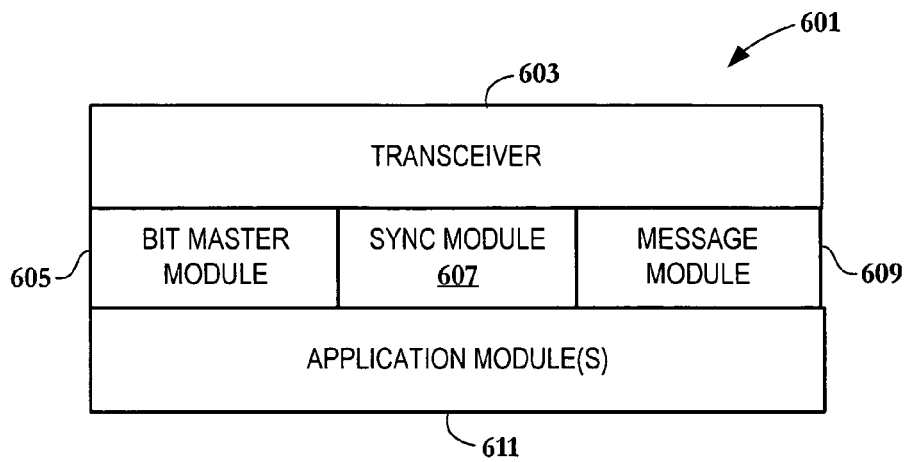
FIG. 6A is a logical block diagram of a node according to embodiments of the present invention.

Node devices according to the present invention may be formed using any combination of hardware and software components. A logical view of a node 601 according to embodiments of the present invention is shown in FIG. 6A. Generally, the node 601 contains a transceiver 603 that allows the node 601 to be electrically coupled to the data bus. The transceiver 603 is contains circuitry that allows electrical characteristics of the bus (e.g., voltages) to be abstracted as dominant and recessive states for inputs to logic circuitry. Three data link logical components are illustrated, a bit master module 605, and sync module 607, and a message module 609.

The sync module 607 is generally configured to detect bit start transitions that are transmitted on the bus. The sync module 607 may perform functions such as sampling and filtering of signals received via the transceiver 603 in order to provide a definitive yes/no determination of whether a transition has occurred. The bit master module 607 contains the logic needed for bit master arbitration. The bit master module 605 generally uses the sync module 607 to determine whether the node 601 should assume or relinquish bit master. For example, the bit master module 607 may measure an elapsed time from the last transition transmitted onto the bus, and begin transmitting the transitions via the transceiver 603 if the elapsed time exceeds a predetermined value.

The message module 609 includes the logic needed to send and receive bits transmitted onto the bus via the transceiver 603. The message module 609 may both transmit onto the bus and detect states of the bus at predetermined times after transitions that are detected via the synch module 607. The message module 609 may include the ability to assemble bits into complete messages, or the message module 609 may simply hand off the bits to a higher level functional module, as represented by the application module 611. The message module 609 and/or application module 611 may also start and stop the transmission of messages based on whether a message start pattern is detected, whether the node 601 is transmitting and has detected a collision, etc.

The message module 609 and/or sync module 607 may also detect bus states and errors and signal these states and errors to the application module 611. For example, the message and/or sync modules 609, 607 may measure times between successive transitions onto the bus in order to detect whether a bit master device has slowed the effective bit rate. If the bit rate satisfies a threshold value, this can be signaled to the application module 611 so that the application module 611 knows it is operating in extended bit mode.

Figure 6B:
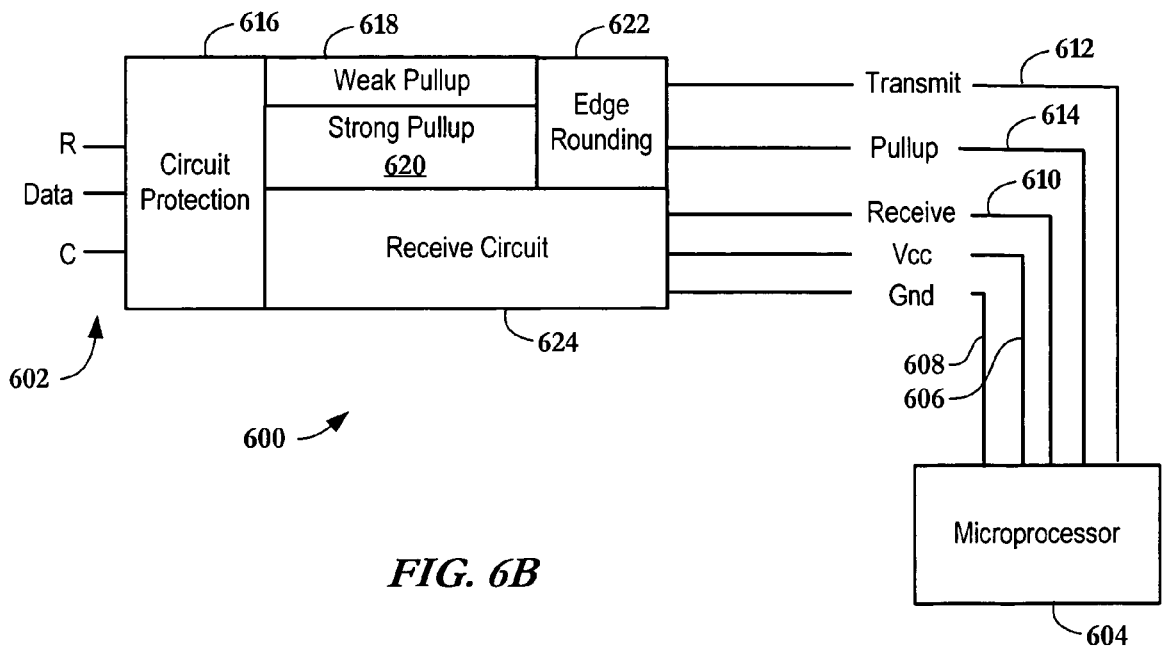
FIG. 6B is a simplified block diagram of a transceiver circuit according to embodiments of the present invention.

In reference now to FIG. 6B, a block diagram is illustrated of an example transceiver 600 according to embodiments of the invention. The transceiver is electrically coupled to the system bus via bus interface 602. The illustrated bus interface 602 interfaces with power and data lines as described in relation to FIG. 2. The transceiver 600 provides conditioning of electrical signals and power for a microprocessor 604.

The microprocessor 604 may be any general-purpose digital processor known in the art. More particularly, the embodiments described herein are adapted for a CMOS microprocessor. The Vcc line 606 is the supply voltage for the microprocessor 604, and the ground line 608 is a common signal return line. The microprocessor 604 interfaces with the transceiver 600 via three digital data lines, receive 610, transmit 612, and pull-up 614. Receive 610 is a digital input pin on the microprocessor 604. Transmit 612 and pull-up 614 are digital output pins on the microprocessor 604.

The transceiver 600 is shown divided into five different functional components: circuit protection 616, weak pull-up 618, strong pull-up 620, edge rounding 622, and receive circuitry 624. The circuit protection 616 provides protection for electrical components of the transceiver 600 and microprocessor 604 in the event of such conditions as overvoltages and miswiring. The weak pull-up 618 provides the ability to assert a weak CommHigh signal on the bus when asserting a recessive state. The strong pull-up 620 provides the stronger current used by Bit Masters when asserting the bit start transition, and is activated via the pull-up line 614 from the microprocessor 604. The edge rounding 622 provides conditioning on positive and negative edges generated by the transceiver 600 in order to reduce line noise. The receive circuitry 624 determines the actual state of the bus data line. This state is communicated to the microprocessor 604 via the receive line 610, and this state may be a different than that state which is concurrently attempted to be transmitted by the microprocessor 604 via the transmit line 612.

In the following sections, example embodiments of transceiver circuits are described that meet the specifications set forth in the body of this document, at a supply voltage at the device terminals from 18 to 30VAC over −40 to 85 C temperature range. Circuits are designed to interface with a CMOS microprocessor with Vcc=4.5 to 5.5V via a three wire bus as described in relation to FIG. 2. Maximum input leakage current is +/−1.0 uAmp. The following are typical microprocessor resources that would be needed to implement node devices as described herein:

Two digital outputs
One digital input with external interrupt on positive and negative edge
Dedicated timer interrupt that can be programmed for 108, 148, 252, 256, and 300 uSec duration+/−7.5%.
Each of above two interrupts can be delayed max of 50 uSec
Clock speeds typically 4-8 mHz
Application layer software typically is polled as often as possible but at least every 25 mSec.
ENVIRACOM code size typically between 1.5K and 10K bytes depending on the number and complexity of messaging, and the microprocessor used.
An LED status indicator
Percent processing usage dependant on number and complexity of messaging; usually less than 25%.

Figure 7:
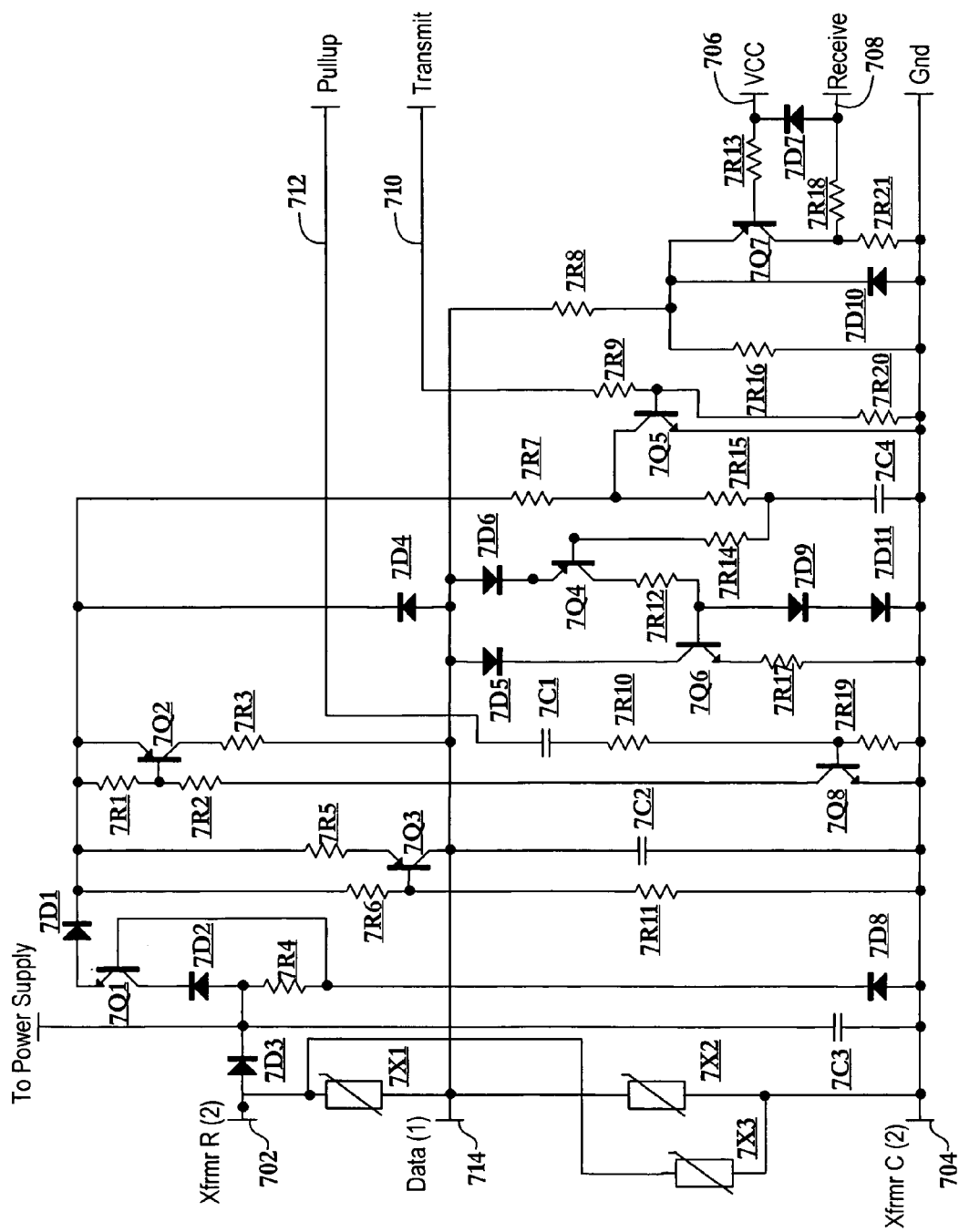
FIG. 7 is a circuit diagram of a transceiver using a half wave rectifier power supply according to embodiments of the present invention.

A more detailed example of a transceiver circuit 700 according to embodiments of the invention is illustrated in FIG. 7. The illustrated transceiver circuit 700 meets the specifications set forth herein, at a supply voltage at the device terminals from 18 to 30VAC. Generally, a 24VAC system transformer is connected to the R 702 and C 704 terminal of the transceiver 700. Earth grounding, if desired, should be made at the C side of the transformer. Diodes 7D3 and 7C3 comprise a half wave unregulated DC source from which the device's power supply can get its source power. Capacitor 7C3 should be sized so that its lowest voltage does not go below 8.53 volts below the peak transformer voltage at 20VAC, and if rated that low, does not go below 6.8 volts below the peak transformer voltage at 18VAC.

Components 7Q1 and 7D8 limit the voltage at the data terminal to approximately 17 VDC for the rest of the circuit. This limits the transient voltage induced onto the transformer voltage through the wire capacitance each time the data line is pulled high or low, and also limits the power dissipation in the pull-up circuitry. Diode 7D1 protects 7Q1 from reverse voltages in the case of miswire. Diode 7D2 is used in order to provide sufficient base current in 7Q1 when the major pull-up circuit is enabled.

The Vcc terminal 706 is the supply voltage for the device's microprocessor. Receive 708 is a digital input pin on the device's microprocessor. Transmit 710 and Pullup 712 are digital output pins on the device's microprocessor. The microprocessor causes a low voltage on the Data terminal 714 by putting a high voltage on Transmit, turning on 7Q5, which causes 7C4 to discharge through 7R15. 7Q4 and 7Q6 form a voltage follower that pulls the data line low as 7C4 discharges. When a low voltage is applied to Transmit, 7Q5 turns off, which allows 7C4 to charge through 7R7 and 7R15. 7Q4 and 7Q6 allow the line to go high as 7C4 charges. This produces a rounded edge on both the high and low data transmissions, which reduces interference on the AM radio band and also reduces induced transients through the wire capacitance back to the transformer. 7R20 dissipates the leakage current after a reset when the microprocessor I/O pin is defaulted to an input. 7R12 protects 7Q4 in the case where the Data is shorted to transformer R. 7D9, 7D11, and 7R17 limit the current through 7Q6 in this same case by acting as a current source. Once the software turns 7Q6 on, it will detect the miswire condition within 250 uSec and turn 7Q6 off. 7Q6 and 7R17 should be able to withstand this high current condition for this length of time.

The Data line 714 is pulled high by the current source consisting of 7Q3, 7R5, 7R6, and 7R11. This current source provides between 1.0 and 2.1 mA. The current source is used instead of a pull-up resistor because, when connected to long lengths of wire, the wire capacitance couples voltage from R 702 to Data 714 (RC voltage). A pull-up resistor would need to be so small to overcome this when the RC voltage is small that it would allow too much current when the RC voltage is large.

Diode 7D4 protects the pullup circuitry when the Data line 714 is shorted to the transformer R line 702. When connected to long lengths of wire, the wire capacitance does not allow the current source to pull the Data line 714 high fast enough, requiring a short high current pull-up, provided by 7Q2, 7Q8, and 7R1, 7R2, and 7R3. When Pullup 712 goes high, 7Q8 turns on, which turns on 7Q2 providing a high current through 7R3 to the data line. This extra pullup is typically only needed for 100 uSec, and such timing may be provided by 7C1 and 7R10.

Components 7Q7, 7R8, 7R13, 7R16, 7R18, and 7R21 allow the microprocessor to determine the state of the data terminal. When the Data line 714 is high, 7Q7 turns on and Receive 708 will be read as high. When the Data line 714 is low, 7Q7 turns off and Receive 708 will be read as low. Diode 7D10 protects the receive circuit when the Data line 714 is shorted to the transfomer R line 702. Diode 7D7 protects the microprocessor by clamping the input voltage to Vcc, however may not be needed if the microprocessor already has built in protection. Capacitor 7C2 is needed only to provide noise immunity. Varistors 7X1 and 7X2 protect the circuit from lightning and ESD transients. An example parts list for the circuit of FIG. 7 is shown below in TABLE 3.

TABLE 3

Example Parts List For Circuit of FIG. 7

| Ref. Designator | Part | Description | Not Needed for Bit Master Incapable |
|---|---|---|---|
| 7C1 | .01 uF | capacitor | X |
| 7C2 | .001 uF | capacitor | |
| 7C3 | 22 uF if not supplying power to the device. Otherwise sized for 8.53 volts below peak transformer voltage at 20 VAC and 6.8 V or less below peak transformer voltage at 18 VRMS | Electrolytic capacitor, 50 V | |
| 7C4 | .001 uF | capacitor | |
| 7D1 | 1N4148 | diode | |
| 7D2 | 1N4148 | diode | |
| 7D3 | S1G | diode | |
| 7D4 | 1N4148 | diode | |
| 7D5 | S1G | diode | |
| 7D6 | 1N4148 | diode | |
| 7D7 | 1N4148 | diode | |
| 7D8 | BZX84C18 | 18 V zener diode | |
| 7D9 | 1N4148 | diode | |
| 7D10 | 1N4148 | diode | |
| 7D11 | 1N4148 | diode | |
| 7Q1 | MMBTA06 | NPN transistor | |
| 7Q2 | MMBTA56 | PNP transistor | X |
| 7Q3 | MMBTA56 | PNP transistor | |
| 7Q4 | MMBTA56 | PNP transistor | |
| 7Q5 | MMBTA06 | NPN transistor | |
| 7Q6 | MMBTA06 | NPN transistor | |
| 7Q7 | MMBTA56 | PNP transistor | |
| 7Q8 | MMBTA06 | NPN transistor | X |
| 7R1 | 100K ohm, 1%, 1/10 W | resistor | X |
| 7R2 | 2.00K ohm, 1%, 1/10 W | resistor | X |
| 7R3 | 100 ohm, 1%, 1/4 W | resistor | X |
| 7R4 | 5.11K ohm, 1%, 1/4 W | resistor | |
| 7R5 | 619 ohm, 1%, 1/10 W | resistor | |
| 7R6 | 5.11K ohm, 1%, 1/10 W | resistor | |
| 7R7 | 10.0K ohm, 1%, 1/10 W | resistor | |
| 7R8 | 10.0K ohm, 1%, 1/4 W | resistor | |
| 7R9 | 10.0K ohm, 1%, 1/10 W | resistor | |
| 7R10 | 5.11K ohm, 1%, 1/10 W | resistor | X |
| 7R11 | 51.1K ohm, 1%, 1/10 W | resistor | |
| 7R12 | 100 ohm, 1%, 1/4 W | resistor | |
| 7R13 | 100K ohm, 1%, 1/10 W | resistor | |
| 7R14 | 10.0K ohm, 1%, 1/10 W | resistor | |
| 7R15 | 10.0K ohm, 1%, 1/10 W | resistor | |
| 7R16 | 31.6K ohm, 1%, 1/4 W | resistor | |
| 7R17 | 2.00 ohm, 1%, 1/4 W | resistor | |
| 7R18 | 100K ohm, 1%, 1/10 W | resistor | |
| 7R19 | 100K ohm, 1%, 1/10 W | resistor | X |
| 7R20 | 100K ohm, 1%, 1/10 W | resistor | |
| 7R21 | 100K ohm, 1%, 1/10 W | resistor | |
| 7X1 | V68MLA1206 | varistor | |
| 7X2 | V68MLA1206 | varistor | |
| 7X3 | V68MLA1206 | varistor | |

Figure 8:
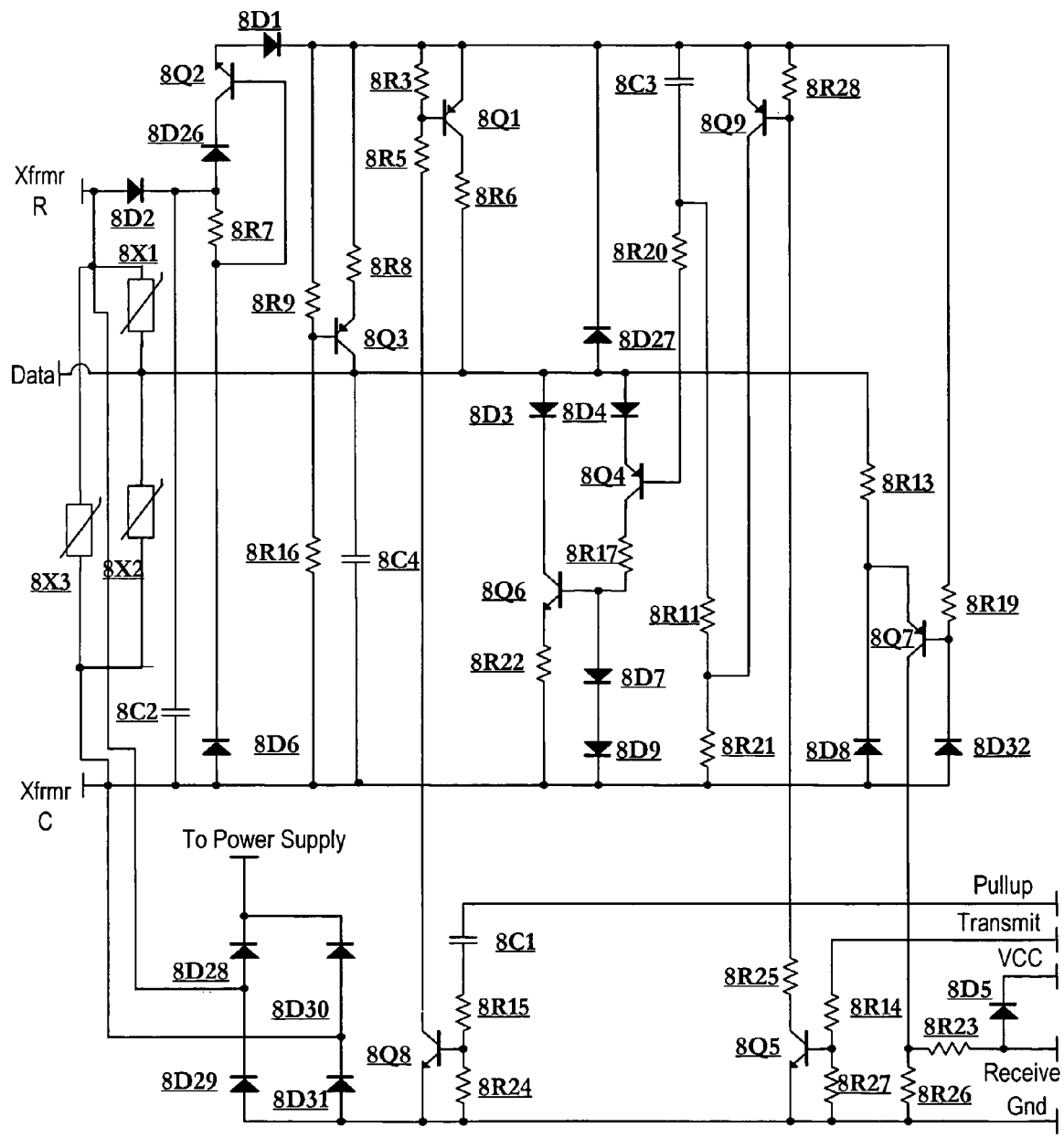
FIG. 8 is a circuit diagram of a transceiver using a full wave rectifier power supply according to embodiments of the present invention.

In reference now to FIG. 8, a transceiver circuit 800 is illustrated with a full wave power supply according to embodiments of the present invention. The circuit 700 is similar to the half wave circuit 700 shown in FIG. 7, however level shifting circuitry is added to reference the microprocessor signals to the full wave bridge. TABLE 4 below is an example parts list for the circuit 800 illustrated in FIG. 8.

TABLE 4

Example Parts List For Circuit of FIG. 8

| Ref. Designator | Part | Description | Not Needed for Bit Master Incapable |
|---|---|---|---|
| 8C1 | .01 uF | capacitor | |
| 8C2 | 22 uF | Electrolytic capacitor, 50 V | |
| 8C3 | .001 uF | capacitor | X |
| 8C4 | .001 uF | capacitor | |
| 8D1 | 1N4148 | diode | |
| 8D2 | S1G | diode | |
| 8D3 | S1G | diode | |
| 8D4 | 1N4148 | diode | |
| 8D4 | 1N4148 | diode | |
| 8D6 | BZX84C18 | 18 V zener diode | |
| 8D7 | 1N4148 | diode | |
| 8D8 | 1N4148 | diode | |
| 8D27 | 1N4148 | diode | |
| 8D32 | BZX84C6V2 | 6.2 V zener diode | |
| 8D9 | 1N4148 | diode | |
| 8Q2 | MMBTA06 | NPN transistor | |
| 8Q1 | MMBTA56 | PNP transistor | X |
| 8Q3 | MMBTA56 | PNP transistor | |
| 8Q4 | MMBTA56 | PNP transistor | |
| 8Q5 | MMBTA06 | NPN transistor | |
| 8Q6 | MMBTA06 | NPN transistor | |
| 8Q7 | MMBTA56 | PNP transistor | |
| 8Q8 | MMBTA06 | NPN transistor | X |
| 8Q9 | MMBTA56 | PNP transistor | X |
| 8R3 | 100K ohm, 1%, 1/10 W | resistor | X |
| 8R28 | 100K ohm, 1%, 1/10 W | resistor | |
| 8R5 | 2.00K ohm, 1%, 1/10 W | resistor | X |
| 8R6 | 100 ohm 1% 1/4 W | resistor | X |
| 8R7 | 5.11K ohm, 1%, 1/4 W | resistor | |
| 8R13 | 10.0K ohm, 1%, 1/4 W | resistor | |
| 8R8 | 619 ohm, 1%, 1/10 W | resistor | |
| 8R9 | 5.11K ohm, 1%, 1/10 W | resistor | |
| 8R19 | 10.0K ohm, 1%, 1/10 W | resistor | |

TABLE 4-continued

Example Parts List For Circuit of FIG. 8

| Ref. Designator | Part | Description | Not Needed for Bit Master Incapable |
|---|---|---|---|
| 8R21 | 10.0K ohm, 1%, 1/10 W | resistor | |
| 8R11 | 10.0K ohm, 1%, 1/10 W | resistor | |
| 8R20 | 10.0K ohm, 1%, 1/10 W | resistor | |
| 8R16 | 51.1K ohm, 1%, 1/10 W | resistor | |
| 8R17 | 100 ohm, 1%, 1/4 W | resistor | |
| 8R22 | 2.00 ohm, 1%, 1/4 W | resistor | |
| 8X1 | V68MLA1206 | varistor | |
| 8X2 | V68MLA1206 | varistor | |
| 8X3 | V68MLA1206 | varistor | |

Figure 9:
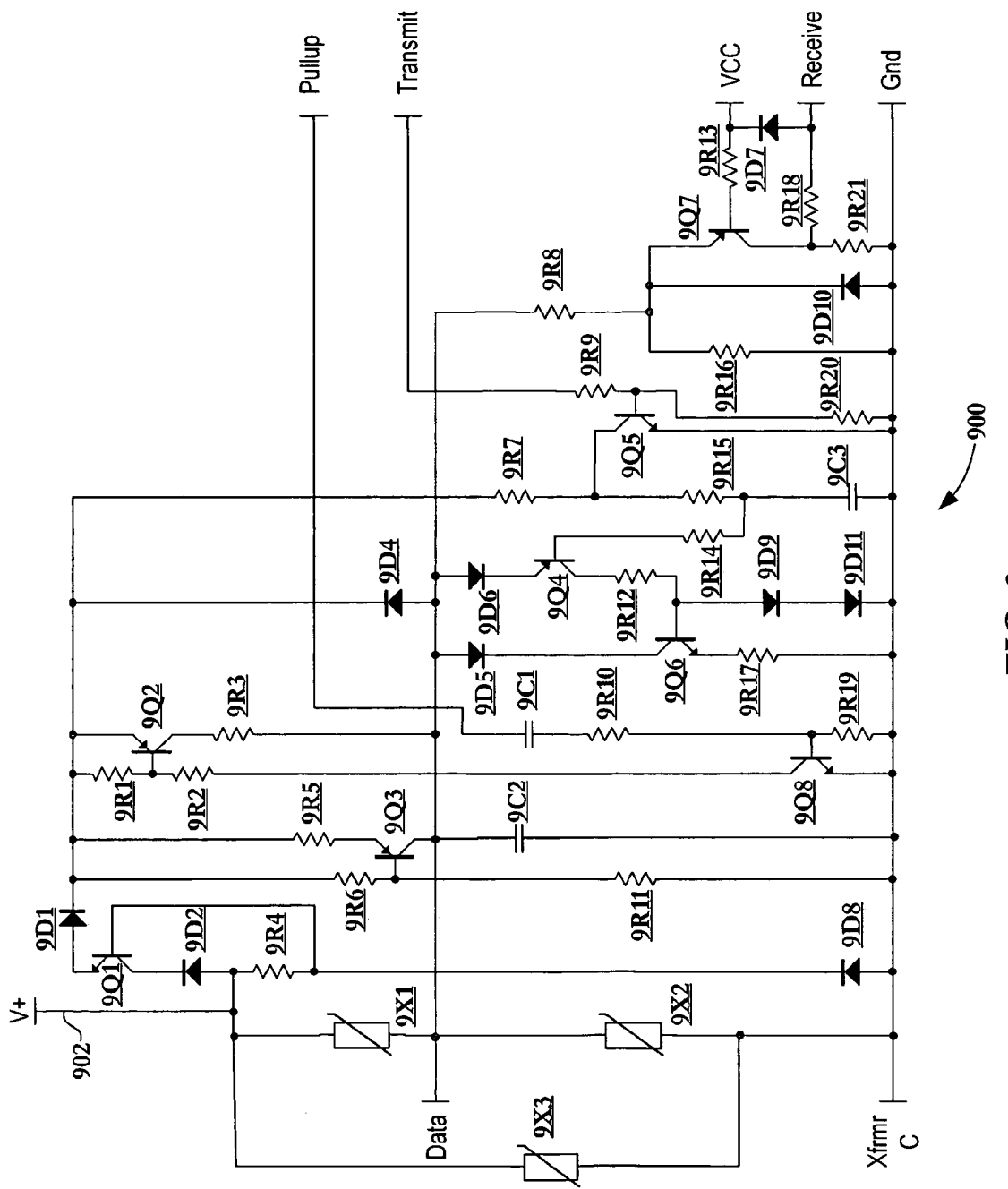
FIG. 9 is a circuit diagram of a transceiver using a device's own power source according to embodiments of the present invention.

A two-wire transceiver can be used when the device supplies its own power rather than getting it from the system transformer. An example two-wire transceiver 900 according to embodiments of the invention is shown in FIG. 9. The circuit and component values are very similar to the example transceiver with half wave power supply described above in relation to FIG. 7, except that the device provides V+ (at line 902) in the range of 15.5 to 42 VDC. An example parts list for the circuit 900 shown below in TABLE 5.

TABLE 5

Example Parts List For Circuit of FIG. 9

| Designator | Part | Description | Not Needed for Bit Master Incapable |
|---|---|---|---|
| 9C1 | .01 uF | capacitor | X |
| 9C2 | .001 uF | capacitor | |
| 9D1 | 1N4148 | diode | |
| 9D2 | 1N4148 | diode | |
| 9D4 | 1N4148 | diode | |
| 9D5 | S1G | diode | |
| 9D6 | 1N4148 | diode | |
| 9D7 | 1N4148 | diode | |
| 9D8 | BZX84C18 | 18 V zener diode | |
| 9D9 | 1N4148 | diode | |
| 9D10 | 1N4148 | diode | |
| 9D11 | 1N4148 | diode | |
| 9Q1 | MMBTA06 | NPN transistor | |
| 9Q2 | MMBTA56 | PNP transistor | X |
| 9Q3 | MMBTA56 | PNP transistor | |
| 9Q4 | MMBTA56 | PNP transistor | |
| 9Q5 | MMBTA06 | NPN transistor | |
| 9Q6 | MMBTA06 | NPN transistor | |
| 9Q7 | MMBTA56 | PNP transistor | |
| 9Q8 | MMBTA06 | NPN transistor | X |
| 9R1 | 100K ohm, 1%, 1/10 W | resistor | X |
| 9R2 | 2.00K ohm, 1%, 1/10 W | resistor | X |
| 9R3 | 100 ohm, 1%, 1/4 W | resistor | X |
| 9R4 | 5.11K ohm, 1%, 1/4 W | resistor | |
| 9R5 | 619 ohm, 1%, 1/10 W | resistor | |
| 9R6 | 5.11K ohm, 1%, 1/10 W | resistor | |
| 9R7 | 10.0K ohm, 1%, 1/10 W | resistor | |
| 9R8 | 10.0K ohm, 1%, 1/4 W | resistor | |
| 9R9 | 10.0K ohm, 1%, 1/10 W | resistor | |
| 9R10 | 5.11K ohm, 1%, 1/10 W | resistor | X |
| 9R11 | 51.1K ohm, 1%, 1/10 W | resistor | |
| 9R12 | 100 ohm, 1%, 1/4 W | resistor | |
| 9R13 | 100K ohm, 1%, 1/10 W | resistor | |
| 9R14 | 10.0K ohm, 1%, 1/10 W | resistor | |
| 9R15 | 10.0K ohm, 1%, 1/10 W | resistor | |
| 9R16 | 31.6K ohm, 1%, 1/4 W | resistor | |
| 9R17 | 2.00 ohm, 1%, 1/4 W | resistor | |
| 9R18 | 100K ohm, 1%, 1/10 W | resistor | |
| 9R19 | 100K ohm, 1%, 1/10 W | resistor | X |
| 9R20 | 100K ohm, 1%, 1/10 W | resistor | |

TABLE 5-continued

Example Parts List For Circuit of FIG. 9

| Designator | Part | Description | Not Needed for Bit Master Incapable |
|---|---|---|---|
| 9R21 | 100K ohm, 1%, 1/10 W | resistor | |
| 9X1 | V68MLA1206 | varistor | |
| 9X2 | V68MLA1206 | varistor | |
| 9X3 | V68MLA1206 | varistor | |

Figure 10:
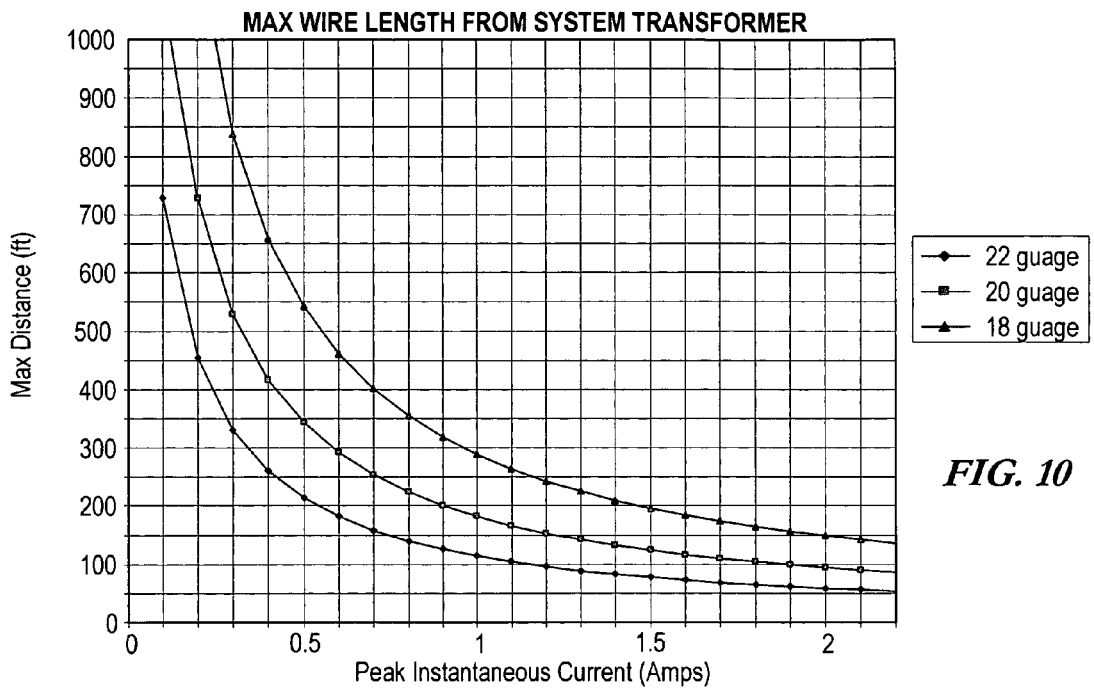
FIG. 10 is a chart of maximum current versus bus distance for bus wiring according to embodiments of the present invention.

A system of multiple nodes may utilize any combination of devices using half-wave and full-wave transceivers as shown in FIGS. 7-9, or any other arrangement known in the art. For example, some devices may not need to draw power from the transformer, therefore those device would only be connected between the Com/Data and C lines of the bus. Devices that draw significant loads generally should be star wired from the system transformer. The maximum allowed distance from the transformer is dependent on the load and wire size. FIG. 10 shows an example distance vs. peak instantaneous load current for various wire sizes according to embodiments of the present invention.

Figure 11:
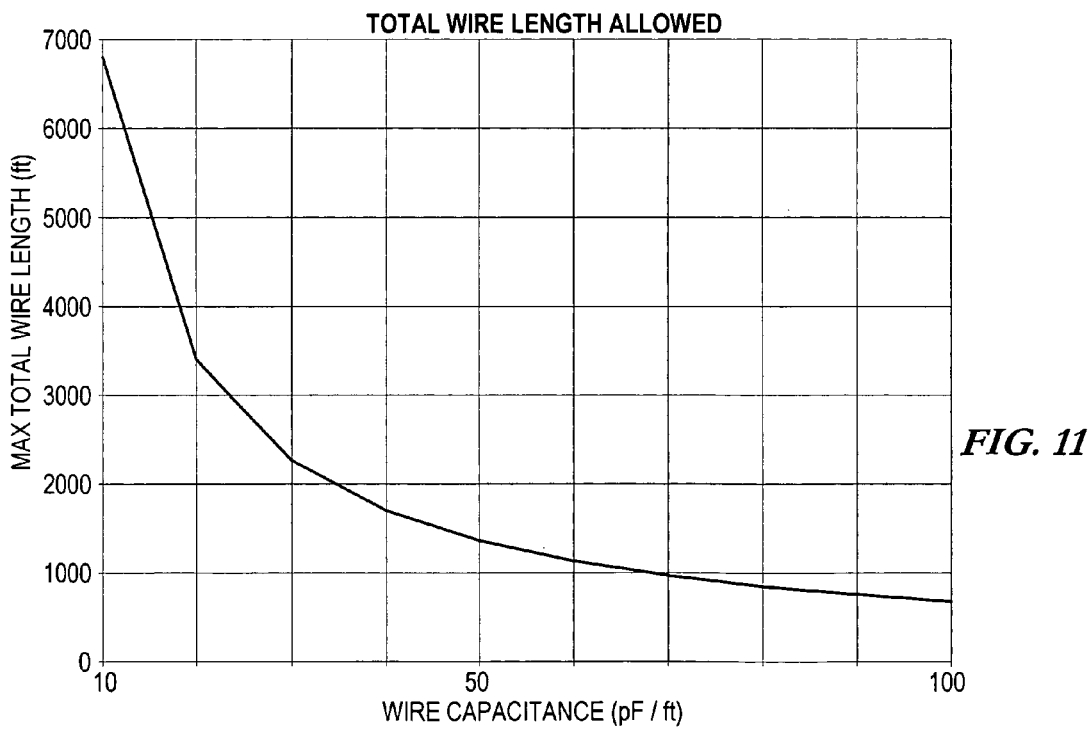
FIG. 11 is a chart of allowable wire length versus wire capacitance for bus wiring according to embodiments of the present invention.

Bus wiring in a system according to the present invention has a free form topology. Wiring may be star, daisy chain, stubs, or any combination, as long as all R connections are wired together, all C connections are wired together, and all Comm connections are wired together. The total capacitance between Comm and C in the wires in a typical system should not exceed 0.068 uF. Typical capacitance for thermostat wire is between 10 and 50 pF per foot, but may be as high as 100 pF per foot. FIG. 11 shows the maximum total length of wire for various wire capacitance values.

Figure 12:
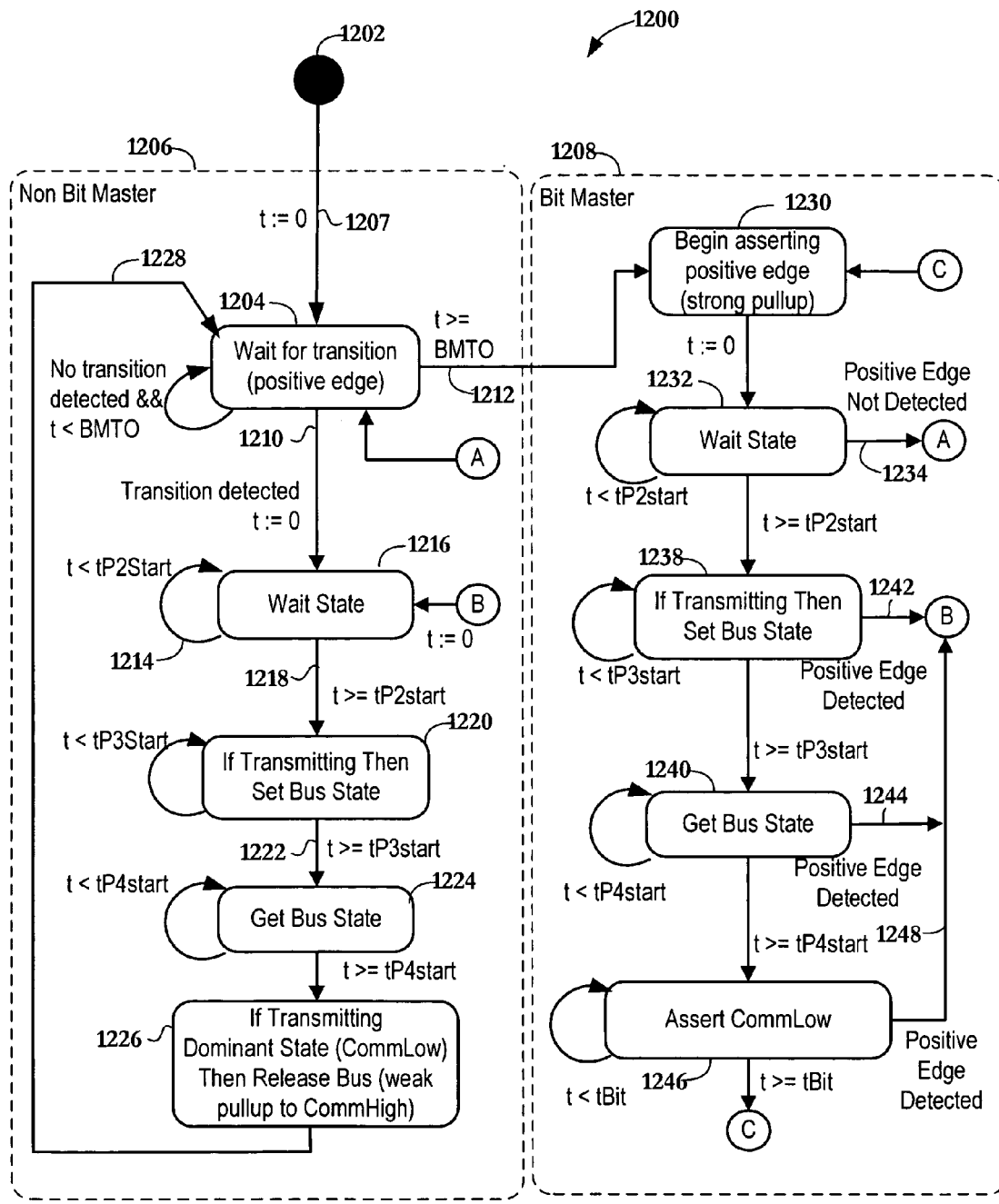
FIG. 12 is a state diagram showing the operation of a Bit Master-Capable node according to embodiments of the present invention.

Each node connected to a bus according to the present invention will be required to synch up with a signal transition transmitted by the Bit Master node. FIG. 12 shows a high level state chart that illustrates an example of how this synchronization may occur. The state chart 1200 of FIG. 12 is a simplified diagram presented for purposes of explanation; many modifications and variations are possible in light of these teachings. After the start state 1202, the node enters a wait for transition state 1204, specifically waiting for a transition from dominant to recessive state (e.g., a positive edge). This wait state 1204 is part of a larger Non-Bit Master state 1206 of the node. Bit-Master-Capable devices will typically start in the Non-Bit Master State 1206, and only assume a Bit Master State 1208 when the current Bit Master stops operations. However, some devices, such as bridges, may go into the Bit Master state 1208 right after the start state 1202.

When first entering the transition wait state 1204, the node will initialize a time variable t to zero, as indicated on path 1207. The node remains in the transition wait state 1204 until either a transition is detected, as indicated by path 1210, or the time variable t times out on the value $t_{BitMasterTimeout}$ (BMTO), as indicated by path 1212. If t times out 1212, the node enters the Bit Master state 1208. If t did not time out, however, then the Bit Master has timely transitioned 1210 the line to start the next bit, and the node reinitializes t to zero and enters a second wait state 1216 before setting or reading values on the data bus. The node remains in this second wait state 1216 until the beginning of the second period (i.e, $t=t_{tP2Start}$), as indicated by path 1214. Once $t>=t_{tP2Start}$, then the node transitions to transmitting state 1220.

If the node is currently transmitting a message, then the node begins transmitting a dominant or recessive state (e.g., CommLow or CommHigh) onto the bus during state 1220. If the node is not transmitting, then the node waits until state 1220 is complete, i.e., when $t>=t_{tP3Start}$, as indicated by path 1222. Following the transmit state 1220, the node enters a reading state 1224 where the state of the bus is determined. If the node was transmitting in the previous state 1220, the node continues transmitting in the read state 1224. During the read state 1224, the node determines the current bit value on the data bus. If the node is transmitting during the read state 1224, then the node will perform arbitration checks to ensure that another node is not transmitting a higher priority message (e.g., the other node is transmitting a dominant bit while this node is transmitting a recessive bit).

The node remains in the bit reading state 1224 up until the beginning of the fourth period of the bit (i.e, $t=t_{tP4Start}$). When $t>=t_{tP4Start}$, the node enters the last state 1226 of the bit. If the node was transmitting a dominant state (e.g., CommLow) during the previous two states 1220, 1224, the node then releases the bus at state 1226, and then reenters the beginning wait state 1208, as indicated by path 1228. Releasing the bus 1226 involves asserting a weak current pullup on the data line. It will be appreciated that the if the node is not transmitting (e.g., no messages queued or lost arbitration), the node will continually assert the weak pullup current during all of the states 1208, 1216, 1220, 1224, 1226. Generally, a Non-Bit-Master node will only set the line low if transmitting a dominant bit at states 1220 and 1224.

A Bit Master Capable node may enter the Bit Master state 1208 if the node detects no positive edge transitions for $t>=t_{BitMasterTimeout}$ as indicated by path 1212. As Bit Master, the node will begin causing a transition on the data bus by asserting 1230 a strong pullup to CommHigh. The node then enters a wait state 1232 where the node samples the state of the data bus for the first period of the bit. If the node does not detect the positive edge during state 1232, the node must relinquish bit master, as indicated by path 1234. Afterwards, the node enters states 1238 and 1240, which are analogous to states 1220 and 1224, respectively, in the Non-Bit Master state 1204. One difference, however, is that if in either of these states 1238, 1240 the node detects a positive edge, the node relinquishes Bit master as indicated by paths 1242, 1244. Another difference is that if the Bit Master detects a dominant state (e.g., CommLow) on the data bus during states 1238, 1240, the node (acting as Bit Master) pulls the line low even if the node is transmitting a recessive bit. If the node did not detect a dominant state (e.g., CommLow) on the bus during states 1238, 1240, the node asserts CommLow at state 1246, which holds the data bus low until the beginning of the next bit at state 1230. If the node detects a positive edge during state 1246, the node relinquishes bit master as indicated by path 1248.

Hardware, firmware, software or a combination thereof may be used to perform the various functions and operations described herein of a data processing arrangement utilizing a serial data bus. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system, apparatus, and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method of communicating between a plurality of nodes coupled via a serial data bus so that simultaneous transmission on the bus of a dominant state by at least one of the nodes and a recessive state by the other nodes results in the dominant state being detectable on the bus, the method comprising:

repeatedly transmitting onto the bus for each bit of a message, a transition from a first state to a second state from a node arbitrarily selected from the plurality of nodes, wherein the first and second states are complementary states selected from the dominant and recessive states, wherein the arbitrarily selected node is defined as the bit master;

transmitting onto the bus a dominant or recessive state from one or more of the nodes at a first predetermined time after each transition, the transmitted state representing a respective dominant or recessive bit of the message;

detecting, at the one or more nodes, a sensed dominant or recessive state of the bus at a second predetermined time after each transition, the sensed dominant or recessive state representing the respective dominant or recessive bit of the message;

ceasing transmission of the message by any of the one or more nodes that transmits the recessive state at the first predetermined time and detects the dominant state at the second predetermined time;

for each node of the plurality of nodes, measuring a timeout value between successive transitions from the first state to the second state onto the bus as transmitted by the bit master; and if the timeout value exceeds a predetermined value, repeatedly transmitting onto the bus a transition from the first state to the second state by a second node arbitrarily selected from the plurality of nodes that are not presently defined as the bit master, wherein the second arbitrarily selected node is thereafter defined as the bit master.

2. The method of claim 1, further comprising transmitting the first state on to the bus by the bit master at a third predetermined time after each transition, the third predetermined time occurring after the second predetermined time.

3. The method of claim 1, wherein repeatedly transmitting onto the bus the transition from the first state to the second state from the bit master comprises repeatedly transmitting onto the bus a transition from the dominant state to the recessive state.

4. The method of claim 1, wherein the transmitting the dominant and recessive states comprise asserting respective first and second voltages on the bus, wherein the second voltage is higher than the first voltage.

5. The method of claim 4, wherein repeatedly transmitting onto the bus the transition from the first state to the second state comprises transmitting on the bus from the first voltage to the second voltage.

6. The method of claim 5, wherein repeatedly transmitting onto the bus the transition from the first voltage to the second voltage comprises transmitting the second voltage using a strong current sufficient to assert the second voltage when the first voltage is present on the bus, and wherein transmitting onto the bus recessive states representing respective recessive bits of the attempted message comprises transmitting the second voltage using a weak current that is sufficient to maintain the second voltage on the bus only if the second voltage is already present on the bus.

7. The method of claim 1, further comprising ceasing repeated transmission of the transition from the first state to the second state onto the bus by the bit master if the bit master does not simultaneously detect the transition while the bit master is transmitting the transition.

8. The method of claim 1, further comprising ceasing repeated transmission of the transition from the first state to the second state onto the bus by the bit master if the bit master detects a transition from the first state to the second state that the bit master did not transmit.

9. A method of communicating between a plurality of nodes coupled via a serial data bus so that simultaneous transmission on the bus of a dominant state by at least one of the nodes and a recessive state by the other nodes results in the dominant state being detectable on the bus, the method comprising:
repeatedly transmitting onto the bus for each bit of a message, a transition from a first state to a second state from a node arbitrarily selected from the plurality of nodes, wherein the first and second states are complementary states selected from the dominant and recessive states, wherein the arbitrarily selected node is defined as the bit master, wherein the bit master is capable of repeatedly transmitting the transition onto the data bus at a time period that is substantially greater than a minimum allowable time period supported by the nodes;
transmitting onto the bus a dominant or recessive state from one or more of the nodes at a first predetermined time after each transition, the transmitted state representing a respective dominant or recessive bit of the message;
detecting, at the one or more nodes, a sensed dominant or recessive state of the bus at a second predetermined time after each transition, the sensed dominant or recessive state representing the respective dominant or recessive bit of the message; and
ceasing transmission of the message by any of the one or more nodes that transmits the recessive state at the first predetermined time and detects the dominant state at the second predetermined time.

10. The method of claim 9, further comprising, for each of the nodes, entering an extended bit mode if the time period satisfies a threshold value.

11. A node operable in a data processing arrangement that includes a plurality of nodes that are capable of communicating with one another via a serial data bus, the node comprising:
a transceiver capable of transmitting and receiving a dominant state and a recessive state on the bus, wherein simultaneous transmission of the dominant state on the bus by at least one of the plurality of nodes and transmission of the recessive state on the bus by any other of the plurality of nodes results in the dominant state being detectable on the bus;
a bit master module capable of detecting, via the transceiver, repeated transitions from a first state to a second state on the bus for each bit interval, wherein the first and second states are complementary states selected from the dominant and recessive states, wherein the bit master module measures a timeout value between successive transitions detected on the bus via the transceiver and causes the transceiver to repeatedly transmit on to the bus the transitions from the first state to the second state for each bit of a message comprising a series of bits if the bit master module detects none of the plurality of nodes transmitting the transition based at least on the timeout value exceeding a predetermined value;
a message module causing the transceiver to transmit the message on the bus, wherein each bit of the message is transmitted by causing the transceiver to,
detect each transition from the first state to the second state on the bus for each bit of the message;
transmit either of the dominant state or recessive state onto the serial bus at a first predetermined time after each transition, the transmitted state representing intended values of a current bit being sent by the node;
detect a state of the bus at a second predetermined time after each transition, the detected state representing an actual value of the current bit on the bus; and
ceasing transmission of bits onto the bus if the node transmits the recessive state and detects the dominant state.

12. The node of claim 11, wherein the bit master module is further configured to:
cease repeated transmission of the transitions from the first state to the second state onto the bus if, while the bit master is transmitting the transitions on to the bus via the transceiver, the bit master module does not simultaneously detect the transitions via the transceiver.

13. The node of claim 11, wherein the first state comprises the dominant state, and the second state comprises the recessive state.

14. The node of claim 13, wherein the dominant and recessive states comprise respective first and second voltages, wherein the second voltage is higher than the first voltage.

15. The node of claim 14, wherein the transceiver further comprises:
a weak current pullup circuit that provides sufficient current to maintain the second voltage on the bus only if the second voltage is already present on the bus; and
a strong current pullup circuit that provides sufficient current to assert the second voltage on the bus if the first voltage is present on the bus; and
wherein the bit master module causes the transceiver to transmit the second voltage using the strong current pullup circuit when transmitting the transition on to the bus, and wherein the message module causes the transceiver to transmit the second voltage using the weak current pullup circuit when transmitting onto the bus recessive states corresponding to recessive bits of a transmitted message.

16. The node of claim 14, wherein the bit master module is further configured to transmit the first voltage on to the bus for a time period just preceding each transition.

17. The node of claim 11, wherein the node is configured to operate in a heating, ventilation, and air conditioning (HVAC) system.

18. A node operable in a data processing arrangement that includes a plurality of nodes that are capable of communicating with one another via a serial data bus, the node comprising:
a transceiver capable of transmitting and receiving a dominant state and a recessive state on the bus, wherein simultaneous transmission of the dominant state on the bus by at least one of the plurality of nodes and transmission of the recessive state on the bus by any other of the plurality of nodes results in the dominant state being detectable on the bus;

a bit master module capable of detecting, via the transceiver, repeated transitions from a first state to a second state on the bus for each bit interval, wherein the first and second states are complementary states selected from the dominant and recessive states, wherein the bit master module measures a timeout value between successive transitions detected on the bus via the transceiver and causes causing the transceiver to repeatedly transmit on to the bus the transitions from the first state to the second state for each bit of a message comprising a series of bits if the bit master module detects none of the plurality of nodes transmitting the transition based at least on the timeout value exceeding a predetermined value;

a message module causing the transceiver to transmit the message on the bus, wherein each bit of the message is transmitted by causing the transceiver to, detect each transition from the first state to the second state on the bus for each bit of the message;

transmit either of the dominant state or recessive state onto the serial bus at a first predetermined time after each transition, the transmitted state representing intended values of a current bit being sent by the node;

detect a state of the bus at a second predetermined time after each transition, the detected state representing an actual value of the current bit on the bus; and ceasing transmission of bits onto the bus if the node transmits the recessive state and detects the dominant state; and wherein the node further comprises an application module configured to utilize messages received via the message module and to enter an extended bit mode when the application module determines that a time period between successive transitions on the bus satisfies a threshold value.

19. A system, comprising:

a serial bus; and a plurality of nodes coupled via the serial bus so that simultaneous transmission on the bus of a dominant state by one of the nodes and a recessive state by any other of the nodes results in the dominant state being detectable on the bus, wherein one or more of the plurality of nodes are configured as bit master capable nodes, the bit master capable nodes including, means for detecting on the bus transitions from a first state to a second state for each bit of a message, wherein the first and second states are complementary states selected from the dominant and recessive states;

means for measuring a timeout value between successive transitions from the first state to the second state; and means for repeatedly transmitting onto the bus the transitions from the first to second state for each bit of a message if the bit master capable node detects none of the plurality of nodes transmitting the transition based at least on the timeout value satisfying a predetermined value; and wherein each node of the plurality of nodes includes, means for transmitting onto the bus a dominant or recessive state at a first predetermined time after each transition, the transmitted state representing a respective dominant or recessive bit of the message;

means for detecting a state of the bus at a second predetermined time after each transition, the detected states representing the respective dominant or recessive bit of the message; and means for ceasing further transmission the message if the recessive state is transmitted and the dominant state is detected at the second predetermined time; and means for measuring a timeout value between successive transitions from the first state to the second state; and means for repeatedly transmitting the transitions onto the bus if the timeout value satisfies a predetermined value.

20. The system of claim 19, wherein each node of the plurality of nodes further comprises:

means for measuring time periods between successive transitions onto the bus; and means for entering into an extended bit state if the measured time periods satisfy a threshold value that is greater than a minimum time period supported by the nodes.

21. A program storage device configured with instructions capable of being executed by a processor of a node coupled to a plurality of nodes coupled via a serial bus so that simultaneous transmission on the bus of a dominant state by one of the nodes and a recessive state by any other of the nodes results in the dominant state being detectable on the bus, the instructions causing the node to perform operations comprising:

detecting on the bus transitions from a first state to a second state for each bit of a message, wherein the first and second states are complementary states selected from the dominant and recessive states;

measuring a timeout value between successive transitions from the first state to the second state;

repeatedly transmitting onto the bus the transitions from the first to second state for each bit of the message if the node detects, based at least on the timeout value satisfying a predetermined value, none of the plurality of nodes transmitting the transition;

transmitting onto the bus the dominant or recessive state at a first predetermined time after each transition, the transmitted state representing a respective dominant and recessive bit of the message;

detecting a state of the bus at a second predetermined time after each transition; and ceasing transmission of the message onto the bus if the node transmits the recessive state at the first predetermined time and detects the dominant state at the second predetermined time.

22. The program storage device of claim 21, wherein the instructions further cause the node to perform:

measuring time periods between successive transitions onto the bus; and entering into an extended bit state if the measured time periods satisfy a threshold value that is greater than a minimum time period supported by the nodes.

* * * * *